(12) United States Patent
Hamilton et al.

(10) Patent No.: US 12,265,565 B2
(45) Date of Patent: Apr. 1, 2025

(54) METHODS, APPARATUSES AND COMPUTER PROGRAM PRODUCTS FOR INTENT-DRIVEN QUERY PROCESSING

(71) Applicant: Optum, Inc., Minnetonka, MN (US)

(72) Inventors: Laura D. Hamilton, Chicago, IL (US); Vinit Garg, Fremont, CA (US); Ayush Tomar, Morgan Hill, CA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/314,441

(22) Filed: May 9, 2023

(65) Prior Publication Data

US 2024/0378223 A1 Nov. 14, 2024

(51) Int. Cl.
*G06F 7/00* (2006.01)
*G06F 16/00* (2019.01)
*G06F 16/332* (2019.01)
*G06F 16/334* (2025.01)
(Continued)

(52) U.S. Cl.
CPC ...... *G06F 16/3344* (2019.01); *G06F 16/3326* (2019.01); *G06F 16/338* (2019.01); *G06F 16/35* (2019.01)

(58) Field of Classification Search
None
See application file for complete search history.

(56) References Cited

U.S. PATENT DOCUMENTS 6,182,068 B1 1/2001 Culliss
6,564,213 B1 5/2003 Ortega et al.
7,657,522 B1 2/2010 Puzicha et al.
(Continued)

FOREIGN PATENT DOCUMENTS

CA 2816517 A1 4/2012
CA 2836381 A1 11/2012
(Continued)

OTHER PUBLICATIONS

International Search Report and Written Opinion for International Application No. PCT/US2023/015396, dated Jun. 19, 2023, (13 pages), European Patent Office, Rijswijk, Netherlands.
(Continued)

*Primary Examiner* — Tuan A Pham
(74) *Attorney, Agent, or Firm* — Alston & Bird LLP

(57) ABSTRACT

Various embodiments of the present disclosure provide query processing techniques for generating optimized query results. The techniques include generating using a machine learning framework, one or more predictions for a natural language query. The one or more predictions may include an intent prediction and an event prediction. The technique may include generating an intent classification for the natural language query based on the intent prediction and the event prediction. The techniques may include in response to the intent classification corresponding to a target query intent: generating, a plurality of candidate data objects based on an identifier associated with the natural language query, identifying one or more relevant data objects from the plurality of candidate data objects based on a relevancy score for each of the plurality of candidate data object; and providing, via a user interface, a natural language query result.

18 Claims, 8 Drawing Sheets

(51) Int. Cl.
  *G06F 16/338* (2019.01)
  *G06F 16/35* (2019.01)

(56) References Cited

U.S. PATENT DOCUMENTS

| | | |
|---|---|---|
| 7,933,859 B1 | 4/2011 | Puzicha et al. |
| 8,100,829 B2 | 1/2012 | Rothman et al. |
| 8,312,138 B2 | 11/2012 | Hull et al. |
| 8,392,207 B2 | 3/2013 | Olaniyan |
| 8,403,847 B2 | 3/2013 | Rothman et al. |
| 8,583,450 B2 | 11/2013 | Baker et al. |
| 8,620,842 B1 | 12/2013 | Cormack |
| 8,706,530 B2 | 4/2014 | Ohnemus et al. |
| 8,972,397 B2 | 3/2015 | Imig et al. |
| 8,996,314 B2 | 3/2015 | Ohnemus et al. |
| 9,058,327 B1 | 6/2015 | Lehrman et al. |
| 9,424,532 B1 | 8/2016 | Abedini et al. |
| 9,436,760 B1 | 9/2016 | Tacchi et al. |
| 10,026,114 B2 | 7/2018 | Tolvanen et al. |
| 10,062,039 B1 | 8/2018 | Lockett |
| 10,176,541 B2 | 1/2019 | Chaudhri et al. |
| 10,262,384 B1 | 4/2019 | Albro et al. |
| 10,409,874 B2 | 9/2019 | Cheng |
| 10,413,779 B2 | 9/2019 | Ingram et al. |
| 10,438,291 B1 | 10/2019 | Neben et al. |
| 10,943,072 B1 | 3/2021 | Jaganmohan |
| 10,943,178 B1 | 3/2021 | Gao et al. |
| 11,004,135 B1 | 5/2021 | Sandler et al. |
| 11,238,113 B2 | 2/2022 | Freese et al. |
| 11,276,089 B1 | 3/2022 | Salehie et al. |
| 11,775,989 B1 | 10/2023 | Hao et al. |
| 12,080,398 B2 | 9/2024 | Nida et al. |
| 2002/0103680 A1 | 8/2002 | Newman |
| 2003/0163349 A1 | 8/2003 | Ho |
| 2005/0060194 A1 | 3/2005 | Brown |
| 2005/0075931 A1 | 4/2005 | Pearson |
| 2005/0165627 A1 | 7/2005 | Fotsch et al. |
| 2008/0133272 A1 | 6/2008 | Marshall |
| 2009/0254402 A1 | 10/2009 | Beall |
| 2010/0063846 A1 | 3/2010 | Shakamuri |
| 2010/0076786 A1 | 3/2010 | Dalton et al. |
| 2010/0179839 A1 | 7/2010 | Collins et al. |
| 2011/0077973 A1 | 3/2011 | Breitenstein et al. |
| 2011/0161110 A1 | 6/2011 | Mault |
| 2012/0089413 A1 | 4/2012 | Balassanian |
| 2012/0296455 A1 | 11/2012 | Ohnemus et al. |
| 2013/0073686 A1* | 3/2013 | Sandholm ........... G06F 16/9537 709/219 |
| 2013/0211858 A1 | 8/2013 | Ohnemus et al. |
| 2014/0067423 A1 | 3/2014 | Joao |
| 2014/0088986 A1 | 3/2014 | Gowdy et al. |
| 2014/0100860 A1 | 4/2014 | Stollmeyer et al. |
| 2014/0129493 A1 | 5/2014 | Leopold |
| 2014/0156308 A1 | 6/2014 | Ohnemus et al. |
| 2014/0310013 A1 | 10/2014 | Ram et al. |
| 2014/0316811 A1 | 10/2014 | Ohnemus et al. |
| 2014/0372133 A1 | 12/2014 | Austrum et al. |
| 2015/0331878 A1 | 11/2015 | Joseph et al. |
| 2016/0048646 A1 | 2/2016 | Stover et al. |
| 2016/0078101 A1 | 3/2016 | Somaiya et al. |
| 2016/0092598 A1 | 3/2016 | Mishra |
| 2016/0110826 A1 | 4/2016 | Morimoto et al. |
| 2017/0249713 A1 | 8/2017 | Serbinis et al. |
| 2017/0270115 A1 | 9/2017 | Cormack et al. |
| 2017/0293923 A1 | 10/2017 | Margolis et al. |
| 2018/0025334 A1 | 1/2018 | Pourfallah et al. |
| 2018/0082030 A1 | 3/2018 | Allen et al. |
| 2018/0165288 A1 | 6/2018 | Chang et al. |
| 2018/0341875 A1 | 11/2018 | Carr |
| 2019/0005409 A1 | 1/2019 | Doshi et al. |
| 2019/0171728 A1 | 6/2019 | Wakankar et al. |
| 2019/0325031 A1 | 10/2019 | Puzicha |
| 2020/0005149 A1 | 1/2020 | Ramanath et al. |
| 2020/0073953 A1 | 3/2020 | Kulkarni |
| 2020/0092695 A1 | 3/2020 | Vigeant et al. |
| 2020/0279641 A1 | 9/2020 | Nida et al. |
| 2020/0342010 A1 | 10/2020 | Rosomoff |
| 2020/0365259 A1 | 11/2020 | Chmait et al. |
| 2021/0090694 A1* | 3/2021 | Colley ................ G16H 15/00 |
| 2021/0174164 A1 | 6/2021 | Hsieh et al. |
| 2021/0319520 A1 | 10/2021 | Winters |
| 2022/0035869 A1 | 2/2022 | Beck et al. |
| 2022/0198573 A1 | 6/2022 | Brown et al. |
| 2023/0138014 A1 | 5/2023 | Bjrkqvist |
| 2023/0169139 A1* | 6/2023 | Baek ................... G06N 20/00 707/722 |
| 2023/0170092 A1 | 6/2023 | Moon et al. |
| 2023/0283987 A1 | 9/2023 | Cheng et al. |
| 2023/0409614 A1 | 12/2023 | Hamilton et al. |
| 2024/0054326 A1 | 2/2024 | Dave et al. |
| 2024/0248901 A1 | 7/2024 | Krishnan et al. |

FOREIGN PATENT DOCUMENTS

| | | |
|---|---|---|
| CA | 2841006 A1 | 1/2013 |
| CN | 103329135 A | 9/2013 |
| CN | 107665217 A | 2/2018 |
| CN | 108304439 B | 7/2021 |
| EP | 2622568 A1 | 8/2013 |
| EP | 2710503 A1 | 3/2014 |
| EP | 2729912 A1 | 5/2014 |
| WO | 2012/050969 A1 | 4/2012 |
| WO | 2012/156374 A1 | 11/2012 |
| WO | 2013/004706 A1 | 1/2013 |
| WO | 2014/087252 A2 | 6/2014 |

OTHER PUBLICATIONS

"Clinical Management Guidelines for Obstetrician-Gynecologists", The American College of Obstetricians and Gynecologists Practice Bulletin, No. 109, Dec. 2009, pp. 1-12.

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

Chapelle, Olivier et al. "A Dynamic Bayesian Network Click Model for Web Search Ranking," In Proceedings of the 18th International Conference on World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Dao, Tien Tuan et al. "Knowledge-Based Personalized Search Engine for the Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification in Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction for Personal Search," In Proceedings of the 2019 World Wide Web Conference (WWW'19), May 13-17, 2019, (7 pages), DOI: 10.1145/3308558.3313706.

Hwang, Sewoong et al. "Toward a Chatbot for Financial Sustainability," Sustainability, vol. 13, No. 6:3173, Mar. 13, 2021, pp. 1-18, DOI: 10.3390/su13063173.

Li, Jianqiang et al. "Diversity-Aware Retrieval of Medical Records," Computers in Industry, vol. 29, pp. 81-91, May 2015, DOI: http://dx.doi.org/10.1016/j.compind.2014.09.004.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Miller, Alissa S. et al. "Improving Stage of Change in an Employee Wellness Program," Workplace Health & Safety, vol. 67, No. 8, pp. 381-290, Aug. 2019, DOI: 10.1177/2165079919838291.

(56) References Cited

OTHER PUBLICATIONS

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Perrault, Evan K. et al. "Employees' Refusals to Participate in an Employer-Sponsored Wellness Program: Barriers and Benefits to Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training for Fast and Accurate Natural Language Processing," Computational Linguistics, vol. 40, No. 3, pp. 563-586, Sep. 1, 2014, DOI: 10.1162/COLL_a_00193.

U.S. Provisional Patent Application, "Automated Health Data Acquisition, Processing and Communication System", U.S. Appl. No. 61/732,203, Unpublished (filed Nov. 30, 2012), (Peter Ohnemus, Inventor), 98 pages, US.

U.S. Provisional Patent Application, "Health Data Acquisition, Processing and Communication System", U.S. Appl. No. 61/387,906, Unpublished (filed Sep. 29, 2010), (Peter Ohnemus, Inventor), 31 pages, US.

U.S. Provisional Patent Application, "Health Data Acquisition, Processing and Communication System", U.S. Appl. No. 61/495,247, Unpublished (filed Jun. 9, 2011), (Peter Ohnemus, Inventor), 50 pages, US.

U.S. Provisional Patent Application, "System and Method for Personal Energy Expenditure Analyses", U.S. Appl. No. 61/486,658, Unpublished (filed May 16, 2011), (Peter Ohnemus, Inventor), 35 pages, US.

Wu, Qiang et al. "Adapting Boosting for Information Retrieval Measures," Learning to Rank for Information Retrieval, vol. 13, pp. 254-270, Jun. 2010, DOI: https://citeseerx.ist.psu.edu/viewdoc/download?doi=10.1.1.157.5117&rep=rep1&type=pdf.

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.

Non-Final Rejection Mailed on Feb. 26, 2024 for U.S. Appl. No. 17/971,491, 11 page(s).

Non-Final Rejection Mailed on Mar. 13, 2024 for U.S. Appl. No. 17/934,688, 20 page(s).

"Semantic Textual Similarity," SBERT.net, (2 pages), (2024), [retrieved from the Internet Sep. 13, 2024] <URL: https://www.sbert.net/examples/training/sts/README.html>.

Final Office Action for U.S. Appl. No. 17/934,688, dated Sep. 13, 2024, (20 pages), U.S. Patent and Trademark Office, US.

Final Rejection Mailed on Sep. 13, 2024 for U.S. Appl. No. 17/934,688, 20 page(s).

Non-Final Rejection Mailed on Sep. 20, 2024 for U.S. Appl. No. 18/047,209, 46 page(s).

Notice of Allowance and Fees Due (PTOL-85) Mailed on Aug. 7, 2024 for U.S. Appl. No. 17/971,491, 7 page(s).

Notice of Allowance and Fees Due (PTOL-85) Mailed on Aug. 28, 2024 for U.S. Appl. No. 17/971,491, 2 page(s).

Non-Final Rejection Mailed on Feb. 10, 2025 for U.S. Appl. No. 17/934,688, 24 page(s).

* cited by examiner

METHODS, APPARATUSES AND COMPUTER PROGRAM PRODUCTS FOR INTENT-DRIVEN QUERY PROCESSING

BACKGROUND

Various embodiments of the present disclosure address technical challenges related to query processing techniques given limitations of existing query engines. Conventional query engines provide query results that are limited to certain terms provided in a query. These limitations lead to a number of technical challenges and difficulties, especially when processing queries for complex knowledge domains. In such domains, users may submit queries relating to complex subject matters that are complicated for a user to navigate or understand. In such a case, the result of a query, even if it is accurate, may still fail to address the user's intent behind the query. The lack of comprehensive query results from one query engine requires users to individually seek data from multiple query engines, call centers, IVR systems, and other disparate knowledge centers for a particular knowledge domain. This may increase network traffic and reduce the performance (e.g., accuracy, completeness, speed, efficiency, computing power, etc.) of query engines, as well as various other systems. To optimize the performance of query engines, data processing operations associated with a query should be intent-driven and tailored to a query in order to provide optimized query results that obviate the need for a user to query data from multiple query engines and/or reduce the number of queries submitted by a user to the same query engine. Various embodiments of the present disclosure make important contributions to existing query engines by addressing these technical challenges.

BRIEF SUMMARY

Various embodiments of the present disclosure provide query processing techniques that leverage a machine learning framework and a curated data corpus to generate optimized query results. The machine learning framework may be leveraged to generate an intent classification for a query submitted by a user. The intent classification for a query may be leveraged to execute one or more specially configured data processing operations that are tailored to the intent behind the query. An optimized query result may be generated based on the one or more specially configured data processing operations. The optimized query results may include an answer to the query as well as anticipated contextual information required by the user, obviating the need for the user to submit multiple queries for a particular knowledge domain. By doing so, some embodiments of the present disclosure provide improved query processing techniques to overcome the technical challenges of conventional query engines.

In some embodiments, a computer-implemented method includes generating, by one or more processors and using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generating, by the one or more processors, an intent classification for the natural language query based on the intent prediction and the event prediction; in response to the intent classification corresponding to the target query intent: generating, by the one or more processors, a plurality of candidate data objects based on an identifier associated with the natural language query; identifying, by the one or more processors, one or more relevant data objects from the plurality of candidate data objects based on a relevancy score for each of the plurality of candidate data objects; and providing, by the one or more processors and via a user interface, a natural language query result for the natural language query, wherein the natural language query result is indicative of the one or more relevant data objects.

In some embodiments, a computing apparatus includes a memory and one or more processors communicatively coupled to the memory. The one or more processors configured to: generate, using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generate an intent classification for the natural language query based on the intent prediction and the event prediction; in response to the intent classification corresponding to the target query intent: generate a plurality of candidate data objects based on an identifier associated with the natural language query; identify one or more relevant data objects from the plurality of candidate data objects based on a relevancy score for each of the plurality of candidate data objects; and provide, by the one or more processors and via a user interface, a natural language query result for the natural language query, wherein the natural language query result is indicative of the one or more relevant data objects.

In some embodiments, one or more non-transitory computer-readable storage media include instructions that, when executed by one or more processors, cause the one or more processors to: generate, using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generate an intent classification for the natural language query based on the intent prediction and the event prediction; in response to the intent classification corresponding to the target query intent: generate a plurality of candidate data objects based on an identifier associated with the natural language query; identify one or more relevant data objects from the plurality of candidate data objects based on a relevancy score for each of the plurality of candidate data objects; and provide, by the one or more processors and via a user interface, a natural language query result for the natural language query, wherein the natural language query result is indicative of the one or more relevant data objects.

DETAILED DESCRIPTION

Figure 1:
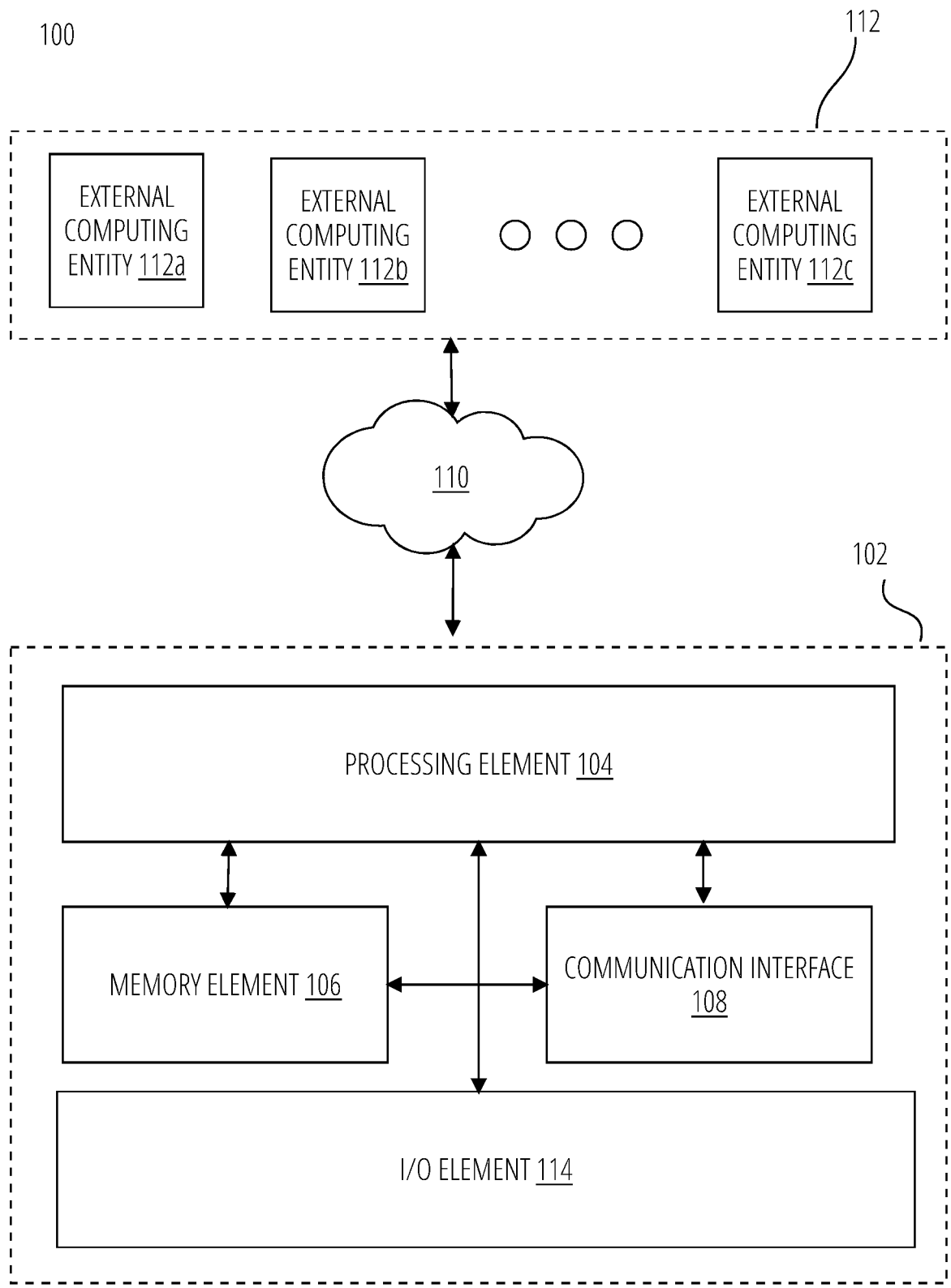
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., query processing techniques, data processing techniques, and/or the like) described herein.

One or more of the external computing entities 112a-c, for example, may include and/or be associated with one or more third-party data sources that may be configured to receive, store, manage, and/or facilitate a data catalog that is accessible to the predictive computing entity 102. By way of example, the predictive computing entity 102 may include a predictive query system that is configured to aggregate data associated with a user to generate optimized query results for the user. The external computing entities 112a-c, for example, may be associated with one or more data repositories, cloud platforms, compute nodes, and/or the like, that may be individually and/or collectively leveraged by the predictive computing entity 102 to resolve a query. In addition, or alternatively, one or more of the external computing entities 112a-c may include one or more querying computing entities, such as a user computing entity, and/or the like. By way of example, the predictive computing entity 102 may include a predictive query system that is configured to receive a query from user computing entity, as described herein.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
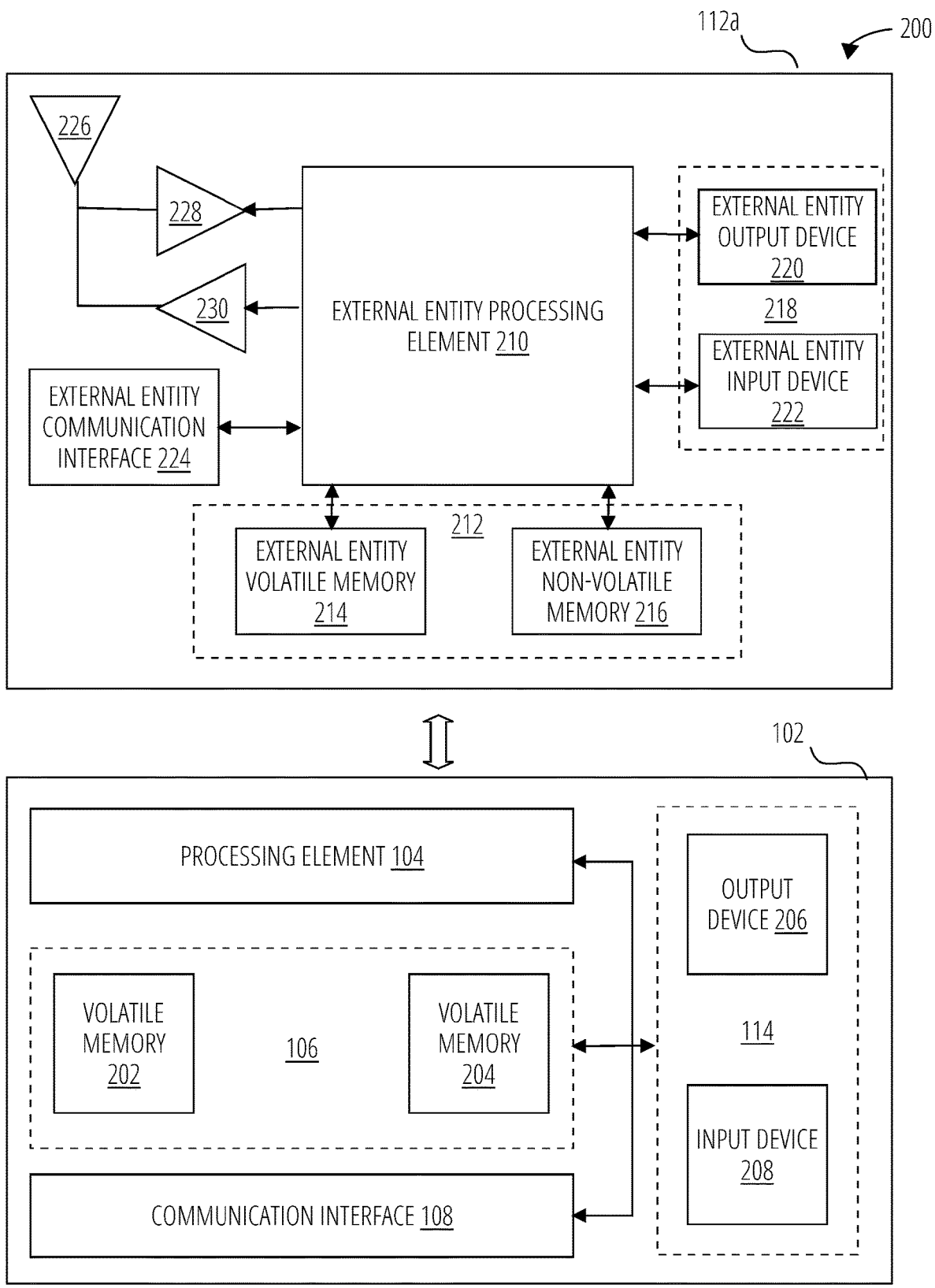
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the External Computing Entity 112a of the computing system 100. The predictive computing entity 102 and/or the External Computing Entity 112a may include a computing apparatus, a computing device, and/or any form of computing entity configured to execute instructions stored on a computer-readable storage medium to perform certain steps or operations.

The predictive computing entity 102 may include a Processing Element 104, a Memory Element 106, a Communication Interface 108, and/or one or more I/O Elements 114 that communicate within the predictive computing entity 102 via internal communication circuitry, such as a communication bus and/or the like.

The Processing Element 104 may be embodied as one or more complex programmable logic devices (CPLDs), microprocessors, multi-core processors, coprocessing entities, application-specific instruction-set processors (ASIPs), microcontrollers, and/or controllers. Further, the Processing Element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the Processing Element 104 may be embodied as integrated circuits, application specific integrated circuits (ASICs), field programmable gate arrays (FPGAs), programmable logic arrays (PLAs), hardware accelerators, digital circuitry, and/or the like.

The Memory Element 106 may include Volatile memory 202 and/or non-Volatile memory 204. The Memory Element 106, for example, may include Volatile memory 202 (also referred to as volatile storage media, memory storage, memory circuitry, and/or similar terms used herein interchangeably). In one embodiment, a Volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The Memory Element 106 may include non-Volatile memory 204 (also referred to as non-volatile storage, memory, memory storage, memory circuitry, and/or similar terms used herein interchangeably). In one embodiment, the non-Volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-Volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-Volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-Volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-Volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The Memory Element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., Processing Element 104), cause the computer to perform one or more steps/operations of the present disclosure. For instance, the Memory Element 106 may store instructions that, when executed by the Processing Element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the Volatile memory 202 and/or the non-Volatile memory 204.

The predictive computing entity 102 may include one or more I/O Elements 114. The I/O Elements 114 may include one or more Output Devices 206 and/or one or more Input Devices 208 for providing and/or receiving information with a user, respectively. The Output Devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The Input Devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a Communication Interface 108, with one or more external computing entities such as the External Computing Entity 112a. The Communication Interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Were, Bluetooth protocols, wireless universal serial bus (USB) protocols, and/or any other wireless protocol.

The External Computing Entity 112a may include an External Entity Processing Element 210, an external entity memory element 212, an External Entity Communication Interface 224, and/or one or more external entity I/O elements 218 that communicate within the External Computing Entity 112a via internal communication circuitry, such as a communication bus and/or the like.

The External Entity Processing Element 210 may include one or more processing devices, processors, and/or any other device, circuitry, and/or the like described with reference to the Processing Element 104. The external entity memory element 212 may include one or more memory devices, media, and/or the like described with reference to the Memory Element 106. The external entity memory element 212, for example, may include at least one External Entity Volatile memory 214 and/or External Entity Non-Volatile memory 216. The External Entity Communication Interface 224 may include one or more wired and/or wireless communication interfaces as described with reference to Communication Interface 108.

In some embodiments, the External Entity Communication Interface 224 may be supported by one or more radio circuitry. For instance, the External Computing Entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the External Computing Entity 112a may be capable of operating with one or more air interface standards, communication protocols, modulation types, and access types. More particularly, the External Computing Entity 112a may operate in accordance with any of a number of wireless communication standards and protocols, such as those described above with regard to the predictive computing entity 102.

Via these communication standards and protocols, the External Computing Entity 112a may communicate with various other entities using means such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). The External Computing Entity 112a may also download changes, add-ons, and updates, for instance, to its firmware, software (e.g., including executable instructions, applications, program modules), operating system, and/or the like.

According to one embodiment, the External Computing Entity 112a may include location determining embodiments, devices, modules, functionalities, and/or the like. For example, the External Computing Entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the External Computing Entity 112a in connection with a variety of other systems, including cellular towers, Wi-Fi access points, and/or the like. Similarly, the External Computing Entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more External Entity Output Devices 220 and/or one or more External Entity Input Devices 222 that may include one or more sensory devices described herein with reference to the I/O Elements 114. In some embodiments, the external entity I/O element 218 may include a user interface (e.g., a display, speaker, and/or the like) and/or a user input interface (e.g., keypad, touch screen, microphone, and/or the like) that may be coupled to the External Entity Processing Element 210.

For example, the user interface may be a user application, browser, and/or similar words used herein interchangeably executing on and/or accessible via the External Computing Entity 112a to interact with and/or cause the display, announcement, and/or the like of information/data to a user. The user input interface may include any of a number of input devices or interfaces allowing the External Computing Entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the External Computing Entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "predictive query system" may refer to a computing entity that is configured to perform query processing for a query. The predictive query system may be configured to receive queries from a plurality of users of the predictive query system and provide optimized query results responsive to the queries. The predictive query system may be associated with a user interface, such as a unified user interface, where a user may submit a query via the user interface. The query system may define a single point of consumption for the user.

In some embodiments, the term "query" may refer to a data entity that describes one or more structured and/or natural language terms and/or phrases. For example, the query may include a structured query and/or a natural language query.

In some embodiments, the term "natural language query" may refer to a data entity that describes one or more natural language terms and/or phrases. For example, the one or more natural language terms and/or phrases may form one or more sentences that define a question expressed in a natural language. In some examples, a natural language query may include user input provided by a user of a query engine. The natural language query, for example, may include a text-based natural language query, a voice-based natural language query, and/or the like. For instance, a text-based natural language query may be provided to a query engine by entering one or more natural language terms and/or phrases into a user interface element, such as a query input box. In addition, or alternatively, a voice-based natural language query may be provided to a query engine by recording (e.g., via an audio recording device, etc.) one or more natural language terms and/or phrases uttered by a user.

In some embodiments, the term "machine learning framework" may refer to a data entity that describes parameters, hyper-parameters, and/or defined operations of a rules-based and/or machine learning model (e.g., model including at least one of one or more rule-based layers, one or more layers that depend on trained parameters, coefficients, and/or the like). The machine learning framework may include one or more machine learning models configured, trained, and/or the like to collectively generate a prediction for a natural language query. The machine learning framework may include one or more of any type of machine learning model including one or more supervised, unsupervised, semi-supervised, reinforcement learning models, and/or the like. In some examples, the machine learning framework may include multiple models configured to perform one or more different stages of a prediction process. By way of example, the machine learning framework may include a first and second machine learning model. The first machine learning model may include an intent prediction model that is trained to generate a first prediction for a natural language query. The second machine learning model may include an event prediction model that is trained to generate a second prediction for the natural language query. In some examples, the second prediction may be leveraged to supplement the first prediction to generate a final prediction from the machine learning framework.

In some embodiments, the term "machine learning intent prediction model" may refer to a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. In some examples, the machine learning intent prediction model may be configured, trained, and/or the like to generate a first prediction for a natural language query that is indicative of a likelihood of a target query intent. For example, the machine learning intent prediction model may be configured to process a natural language query to generate one or more outputs indicative of the likelihood of each of one or more query intents. The machine learning intent prediction model may include one or more of any type of machine learning model including one or more supervised, unsupervised, semi-supervised, reinforcement learning models, and/or the like. In some examples, the machine learning intent prediction model may include multiple models configured to perform one or more different stages of a prediction process.

In some embodiments, the machine learning intent prediction model includes a transformer model. By way of example, the machine learning intent prediction model may include one or more language models, such as a bidirectional encoder representation from transformers (BERT) models, universal sentence encoder models, and/or the like. By way of example, the machine learning intent prediction model may include a universal sentence encoder that is previously trained using one or more supervised and/or unsupervised machine learning techniques to transform a natural language query into one or more query embeddings and generate at least one intent prediction for the natural language query that is indicative of a likelihood of a target query intent.

In some embodiments, the term "machine learning event prediction model" may refer to a data entity that describes parameters, hyper-parameters, and/or defined operations of a rules-based algorithm and/or machine learning model (e.g., model including at least one or more rule-based layers, one or more layers that depend on trained parameters, coefficients, and/or the like). In some examples, the machine learning event prediction model may be configured, trained, and/or the like to generate a second prediction for a natural language query that is indicative of a likelihood of a target event. For example, the machine learning event prediction model may be configured to process a natural language query to generate one or more outputs indicative of the likelihood of each of a plurality of events. The machine learning event prediction model may include one or more of any type of machine learning model including one or more supervised, unsupervised, semi-supervised, reinforcement learning models, and/or the like. In some examples, the machine learning event prediction model may include multiple models configured to perform one or more different stages of a prediction process.

In some embodiments, the machine learning event prediction model includes a neural network, such as a recurrent neural network. In some examples, the machine learning event prediction model may include one or more recurrent neural networks that are previously trained, using one or more supervised and/or unsupervised machine learning techniques, to generate an event prediction for a natural language query. By way of example, the machine learning event prediction model may include a seq2seq model configured to generate at least one intent prediction indicative of the likelihood of a target event based on the natural language query.

In some embodiments, the term "target query intent" may refer to a data entity that describes an intent behind a query. A target query intent may include one or more intent classes of an intent classification taxonomy that are each associated with one or more different types of query results achievable through different query processing pipelines. Each query processing pipeline, for example, may be configured to generate candidate data objects that may be assigned to a query, such as a natural language query. In some examples, each intent class in an intent classification taxonomy may be associated with a set of one or more data processing operations of a plurality of sets of one or more data processing operations. In some examples, a target query intent classification may prompt performance of the one or more data processing operations. The target query intent may define a category of queries that may be assigned the particular intent class. By way of example, in a healthcare knowledge domain, an example target query intent may include a healthcare financial intent. The healthcare financial intent, for example, may be assigned to healthcare account-related queries such as a health savings account balance query, a health savings account history query, a health savings account spending query, a financial savings account balance query, a financial savings account spending query, and/or the like.

In some embodiments, the term "target event" may refer to a data entity that describes a real-world event or a virtual event that may be predictive of a target query intent. For example, the target event may include an event that is associated with a user that provided the query. The occurrence and/or likelihood of the occurrence of the event may relate to the likelihood of a target query intent for a query submitted by the user. For example, a target event may relate to a target query intent, whereby the occurrence and/or likelihood of occurrence of the target event may increase (and/or decrease) the likelihood that a user may have a target query intent behind a submitted query. By way of example, in a healthcare knowledge domain, the submission of a medical claim may increase the likelihood that a user's intent behind a query is related to a medical claim, coverage for a medical claim, and/or the like. In such a case, the target query intent may be a healthcare financial intent and the example target event may include the submission of a medical claim.

In some embodiments, "intent classification taxonomy" may refer to a data structure for classifying a query. The intent classification taxonomy may include a plurality of intent classes that may be assigned to, for example, a natural language query. In some embodiments, the intent classification taxonomy is associated with a particular knowledge domain. By way of example, an intent classification taxonomy may represent an intent classification space associated with a query engine. In some examples, each class in the intent classification taxonomy may be associated with one or more data processing operations for generating candidate data objects for a query that is assigned the respective class.

In some embodiments, "intent classification" is a data entity that describes a predicted intent class for a query, such as a natural language query. The predicted intent class may be indicative of the intent behind the query. By way of example, a predicted intent class may be predicted for a query from an intent classification taxonomy associated with a particular knowledge domain. In some embodiments, the intent classification for a query enables execution of one or more data processing operations that are specially configured for a query based on the intent classification for the query. For example, a set of one or more specially configured data processing operations may be performed responsive to a query based on the intent classification for the query. In some examples, the one or more data processing operations may include analytics performed on a curated data corpus.

In some embodiments, the term "candidate data object" may refer to a data object that includes data that represents a candidate canonical answer and/or candidate supplemental answer (e.g., contextual information) to a query. A candidate data object may be generated based on performing one or more data processing operations. A candidate data object may be in the form of text string(s), numerical character(s), alphabetical character(s), alphanumeric code(s), ASCII character(s), a pointer, a memory address, and/or the like. In some examples, A candidate data object includes a query descriptor that describes a query representative and a result value that represents a candidate canonical answer to the query and/or represents a candidate supplemental answer to the query. By way of example, the candidate data object may be structured as [query descriptor: result value]. In a healthcare knowledge domain, for example, where a query is "how much is left in my HSA," example candidate data object may include [How much is left in HSA: $683.44], [Amount spent year to date in HSA: $1816.56], [Most recent HSA transaction: $199.99 from Optum Store on May 13, 2022], and/or the like.

In some embodiments, the term "relevant data object" may refer to a candidate data object that includes data/or information that answers a query. In some embodiments, a relevant data object includes data/or information that corresponds to the canonical (e.g., specific) answer to the query or that corresponds to a supplemental answer to the query. In some examples, a relevant data object is determined based on a relevancy measure, such as a semantic similarity score, a syntactic similarity score, a combination thereof, and/or the like. By way of example, a relevant data object may describe a candidate data object associated with a relevancy score that satisfies a semantic similarity score threshold, a syntactic similarity score threshold, a combination thereof, and/or the like.

In some embodiments, the term "intent prediction" may refer to a data entity that describes a machine learning output. An intent prediction may be indicative of a likelihood that the intent for a query is a target query intent. An intent prediction may be generated using a machine learning model, such as a machine learning intent prediction model. In some examples, an intent prediction may be supplemented with one or more other machine learning predictions to generate an intent classification with improved accuracy.

In some embodiments, the term "event prediction" may refer to a data entity that describes a machine learning output. An event prediction may be indicative of a likelihood of a target event. An event prediction may be generated using a machine learning model, such a machine learning event prediction model. In some examples, an event prediction may supplement another machine learning prediction to improve prediction accuracy. For example, an event prediction may supplement an intent prediction.

In some embodiments, the term "relevancy score" may refer to a data value that indicates a relevancy level of a candidate data object to a query, such as a natural language query. In some examples, the relevancy score may be indicative of a syntactic relevance and/or semantic relevance of a candidate data object to a query. For example, the relevancy score for a candidate data object may be indicative of a syntactic similarity between the candidate data object and a query. As another example, a relevancy score for a candidate data object may be indicative of a semantic similarity between the candidate data object and a query. As yet another example, the relevancy score for a candidate data object may be indicative of the syntactic similarity between the candidate data object and a query as well as the semantic similarity score between the candidate data object and the query. By way of example, a relevancy score for a candidate data object may be generated by calculating the syntactic similarity and/or semantic similarity between query embeddings of the query and the candidate data object. In such an example, the query embeddings may be generated from deep learning models that are trained on large corpus such as, but not limited to, universal sentence encoding, BERT-based models (PubMedBERT, BioBERT etc.). Additionally, or alternatively, a relevancy score for a candidate data object may be generated from syntactic similarity and/or semantic similarity between query embeddings and the candidate data object based on other techniques such as, but not limited to, Jaccard similarity, TF-IDF similarity, and/or the like. The relevancy score may provide a qualitative and/or quantitative relevance value that indicates how likely a candidate data object represents a correct query result. For example, a relevancy score for a candidate data object may be predictive of a relevant data object.

In some embodiments, the term "data processing operation" may refer to a data entity that describes a computing task associated with the execution of a query. For example, a data processing operation may include data expression that may represent computing task for executing a query. A data processing operation, for example, may include a filter operation for identifying data associated with a user, a sorting operation for organizing data in accordance with one or more sorting objectives (e.g., ascending order, descending order, and/or the like), a summation operation for adding rows of a table (e.g., such as relational table) associated with a data repository, a subtraction operation, a search operation for retrieving data associated with a user, and/or the like.

In some embodiments, the term "natural language query result" may refer to a data entity that describes one or more natural language terms and/or phrases. For example, the one or more natural language terms and/or phrases may form one or more sentences that define a query result expressed in a natural language. In some examples, a natural language query result may be provided to a user via a user interface associated with a query engine.

In some embodiments, the term "feature vector" may refer to a type of vector that represents numerical or symbolic characteristics (also referred to as "features") associated with data. For example, an example feature vector may be in the form of an n-dimensional vector of numerical or symbolic features that describe one or more data objects (such as, but not limited to, query data object, candidate data object, user profile data object). In some embodiments, one or more feature vectors are provided to machine learning models.

In some embodiments, the term "query embedding" may refer to a type of feature vector that is associated with syntactic and/or semantic characteristics of a query. For example, an example query embedding may be in the form of an n-dimensional vector of syntactic and/or semantic features of an example query. In some examples, an example query embedding is generated from syntactic representation(s) and/or semantic representation(s). In some examples, syntactic representations are generated based on techniques such as, but not limited to, frequency-inverse document frequency (TF-IDF) and/or the like. In some examples, semantic representations are generated based on, for example but not limited to, providing the query to a machine learning model such as, but not limited to, a deep learning model (e.g., Bidirectional Encoder Representations from Transformers (BERT), etc.).

In some embodiments, the term "identifier" may refer to one or more items of data by which a user associated with a query may be uniquely identified. For example, an identifier may comprise one or more of American Standard Code for Information Interchange (ASCII) text, encryption keys, identification certificates, a pointer, an Internet Protocol (IP) address, a URL, a MAC address, a memory address, or other unique identifier, or combinations thereof.

In some embodiments, the term "training dataset" may refer to an input dataset that is used to train a machine learning model. In some examples, the training dataset may include an input dataset that is associated with ground truth data. The ground truth data, for example, may include one or more ground truth labels for each of the data fields of the training dataset.

In some embodiments, the term "unified user interface" may refer to a user interface associated with a query engine. The user interface may be configured for receiving queries and displaying corresponding query results from one or more knowledge domains. For example, a unified user interface may be configured to support various disparate queries (e.g., queries associated with different subject matters and/or knowledge domains).

IV. Overview, Technical Improvements, and Technical Advantages

Some embodiments of the present disclosure present query processing techniques that improve conventional query engines by identifying and intelligently processing queries to generate optimized query results. The query processing techniques may be leveraged to maintain and access a curated data corpus across a plurality of users and data sources to generate optimized query results for a user based on specially configured data processing operations tailored to the intent behind the query. As described herein, the curated data corpus may include records of qualifying events that are associated with a plurality of users. Upon receiving a query from a particular user, some embodiments of the present disclosure may generate an intent classification for the query. The intent classification may be leveraged to execute one or more specially configured data processing operations that are tailored to the intent behind the query (e.g., rather than merely the text of the query). The specially configured data processing operations may be applied to the curated data corpus to generate a comprehensive query result that, unlike conventional query results, is tailored to the intent of the user and anticipates contextual information required by the user. In this manner, using some of the techniques of the present disclosure, one query engine may be used to generate a comprehensive query result capable of replacing a plurality of queries from disparate query engines by anticipating the needs of the user.

Some embodiments of the present disclosure present query processing techniques that leverage analytics on a curated data corpus to generate an optimized query result that provides canonical and supplemental answers (e.g., contextual information) responsive to a query. Unlike conventional query techniques, the query processing techniques of the present disclosure may define a single point of consumption for a user to query data based on a single query entry without the need for the user to query another source, be redirected to another source to pull various disparate data, and/or perform any further analysis with the query results. In this regard, various embodiments of the present disclosure reduce the need for users of query engines to submit multiple queries, which in turn reduces the overall number of queries transmitted to query engines, and hence reduces network traffic and operational load on query engines. By reducing network traffic and operational load on query engines, various embodiments, of the present disclosure improve operational reliability and computational efficiency of query engines.

Example inventive and technologically advantageous embodiments of the present disclosure include (i) a machine learning framework specially configured to facilitate intent-driven query processing in complex knowledge domains, (ii) query processing techniques for providing query results that are tailored to the intent behind a query, (iii) data aggregation techniques for maintaining a curated data corpus that facilitates accurate and comprehensive query results, among others.

V. Example of System Operations

As indicated, various embodiments of the present disclosure make important technical contributions to query processing technology. In particular, systems and methods are disclosed herein that implement query processing techniques for providing optimized query results. Unlike conventional query techniques, the query processing techniques of the present disclosure leverage a machine learning framework and analytics on a curated data corpus to generate optimized query results that provide canonical answers responsive to the query, as well as contextually relevant supplemental answers based on a predicted intent behind the query.

Figure 3:
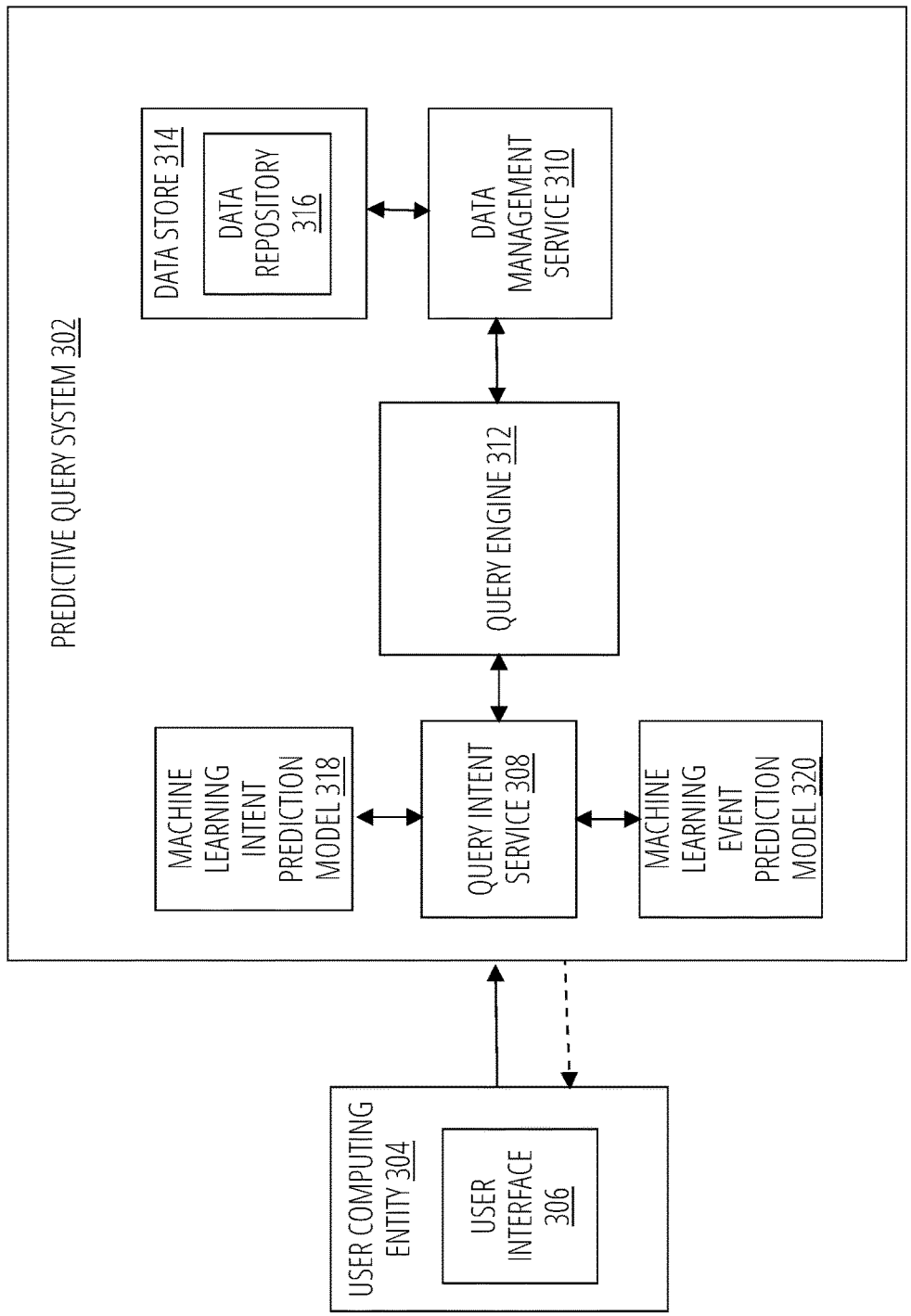
FIG. 3 is a system diagram showing example computing entities for facilitating generation of optimized query results in accordance with some embodiments discussed herein.

FIG. 3 is a system diagram 300 showing example computing entities for facilitating generation of optimized query results in accordance with some embodiments discussed herein. In some embodiments, the system diagram 300 includes a predictive query system 302 configured to interact with a user computing entity 304. The predictive query system 302 may include a predictive computing entity, such as the predictive computing entity 102 described herein. The user computing entity 304 may include an external computing entity, such as one of the external computing entities 112a-c described herein.

For example, the user computing entity 304 may interact with the predictive query system 302 by submitting a query to the predictive query system 302. In some embodiments, the query may be submitted by a user interface 306 associated with (e.g., hosted by, provided by, affiliated with, etc.) the predictive query system 302. In some examples, the user interface 306 may support a textual input of a query, a voice input of a query, and/or the like. In some embodiments, the user interface 306 is a unified user interface that is configured to receive queries associated with multiple disparate subject matters and/or knowledge domains.

In some embodiments, the predictive query system 302 is a computing entity that is configured to perform query processing, such as a natural language query processing, to generate optimized query results. The predictive query system 302 may be configured to facilitate a plurality of computing functionalities to provide a seamless experience for a user. Using some of the techniques of the present disclosure, the predictive query system 302 optimizes speed of query results, query result accuracy, and query result completeness.

In some embodiments, the user computing entity 304 is a computing entity that is operated by a user. As described above, in some embodiments, a user computing entity 304 accesses the predictive query system 302 to submit a query. In some embodiments, the user computing entity 304 leverages the user interface 306 for the predictive query system 302 to submit a query to the predictive query system 302.

In some embodiments, the predictive query system 302 supports a natural language query. By way of example, the user computing entity 304 may submit a natural language query to the predictive query system 302 via the user interface 306. In some embodiments, a natural language query is a data entity that describes one or more natural language terms and/or phrases. For example, the one or more natural language terms and/or phrases may form one or more sentences that define a question expressed in a natural language. In some examples, a natural language query may include user input provided by a user of a query engine. The natural language query, for example, may include a text-based natural language query, a voice-based natural language query, and/or the like. For instance, a text-based natural language query may be provided to a query engine by entering one or more natural language terms and/or phrases into a user interface element, such as a query input box. In addition, or alternatively, a voice-based natural language query may be provided to a query engine by recording (e.g., via an audio recording device, etc.) one or more natural language terms and/or phrases uttered by a user. In some examples, a natural language query may enable a user to submit a query without knowledge of the specific logical language of the query system.

In some embodiments, the predictive query system 302 leverages a query engine 312 to enable near real-time analytics by querying data from a curated data corpus to improve query result accuracy and computing efficiency. In some embodiments, the query engine 312 is a computing entity configured to perform one or more functionalities to facilitate generation of an optimal query result in response to a query. To do so, the query engine 312 may leverage various other components of the predictive query system 302, such as data management service 310, query intent service 308, and/or the like.

In some embodiments, the data management service 310 is a computing entity configured to store, maintain, and or monitor a data store 314. In some embodiments, the data store 314 is an on-premises data store. In some embodiments, the data store 314 is a remote datastore, such as a cloud-based datastore. In some embodiments, the data store 314 includes a data repository 316, such as a database, and/or the like for persistently storing and managing one or more curated data corpus associated with a plurality of users. In some embodiments, the curated data corpus includes records of qualifying events associated with the plurality of users. In some embodiments, the plurality of users may be associated with a knowledge domain. In some embodiments, the plurality of user may have previously registered with the predictive query system 302 and/or may be associated with the predictive query system 302. In a healthcare knowledge domain, for example, the plurality of users may include members of a healthcare insurance provider. In some embodiments, the data management service 310 may generate and maintain the curated data corpus.

In some embodiments, a qualifying event is a real-world event or virtual event associated with a user. A qualifying event may describe an event whose occurrence is deemed qualified to add to a curated data corpus, such as the curated data corpus maintained by the data repository 316. In some embodiments, a qualifying event depends on the knowledge domain. For example, in a healthcare knowledge domain, qualifying events may include healthcare-related events such as healthcare savings account (HSA) funding events, healthcare savings account (HSA) spending events, and/or the like. In some embodiments, the data repository 316 is a relational database configured to store and facilitate management of the curated data corpus. In some examples, the relational database may include one or more columns storing the curated data corpus. In the healthcare knowledge domain, for example, the data repository may include a relational database that includes one or more of a primary key column, a human-readable transaction description column, a debit account column, a credit account column, an amount column (e.g., dollar amount column), a transaction type column (e.g., internal, debit card, or cheque), transaction date column, and/or the like.

In some embodiments, the data management service 310 is configured to securely receive event data associated with a qualifying event from one or more data sources and store the received event data in the data repository 316. In some embodiments, the data management service 310 is configured to monitor the one or more data sources for occurrence of a qualifying event associated with a user, and update the data repository 316 in response to the occurrence of the qualifying event. By way of example, in response to occurrence of a qualifying event, the data management service 310 may be configured to add a data entry corresponding to a qualifying event to the data repository 316. In some embodiments, the data management service 310 may verify and/or aggregate the qualifying event data before and/or after storing in the data repository 316.

In some embodiments, the data repository is leveraged for various functionalities. By way of example, in a healthcare knowledge domain, the data repository 316 may be leveraged for generating query results, identifying "upsell or cross-sell" opportunities (such as user who may benefit from switching to a different health plan), aggregating and/or generating financial reporting, generating and/or reporting on financial behavior trends, providing user insights/user-facing tips (such as recommendations for amount to elect to put into an HSA during open enrollment, which, for example, can help a user take better advantage of available benefits and optimize financial choices).

In some embodiments, the predictive query system 302 includes a local cache, and/or the like that is configured to temporarily store one or more query results. By way of example, the predictive query systems 302 may include one or more cache memories, each configured to store and/or maintain query results for a temporary time duration.

In some embodiments, the query intent service 308 is a computing entity configured to perform one or more operations to facilitate computing efficiency and optimized query results. To do so, the query intent service 308 may leverage a machine learning framework to generate an intent classification for a query.

In some embodiments, a machine learning framework is a data entity that describes parameters, hyper-parameters, and/or defined operations of a rules-based and/or machine learning model (e.g., model including at least one of one or more rule-based layers, one or more layers that depend on trained parameters, coefficients, and/or the like). The machine learning framework may include one or more machine learning models configured, trained, and/or the like to collectively generate a prediction for a natural language query. The machine learning framework may include one or more of any type of machine learning model including one or more supervised, unsupervised, semi-supervised, reinforcement learning models, and/or the like. In some examples, the machine learning framework may include multiple models configured to perform one or more different stages of a prediction process. By way of example, the machine learning framework may include a first and second machine learning model. The first machine learning model may include an intent prediction model that is trained to generate a first prediction for a natural language query. The second machine learning model may include an event prediction model that is trained to generate a second prediction for the natural language query. In some examples, the second prediction may be leveraged to supplement the first prediction to generate a final prediction from the machine learning framework. In some embodiments, the query intent service 308 leverages a machine learning framework that includes a machine learning intent prediction model 318 and/or a machine learning event prediction model 320.

In some embodiments, a machine learning intent prediction model is a data entity that describes parameters, hyperparameters, and/or defined operations of a rules-based algorithm and/or machine learning model (e.g., model including at least one or more rule-based layers, one or more layers that depend on trained parameters, coefficients, and/or the like), and/or the like. In some examples, the machine learning intent prediction model may be configured, trained, and/or the like to generate a first prediction for a natural language query that is indicative of a likelihood of a target query intent. For example, the machine learning intent prediction model may be configured to process a natural language query to generate one or more outputs indicative of the likelihood of each of one or more query intents. The machine learning intent prediction model may include one or more of any type of machine learning model including one or more supervised, unsupervised, semi-supervised, reinforcement learning models, and/or the like. In some examples, the machine learning intent prediction model may include multiple models configured to perform one or more different stages of a prediction process.

In some embodiments, the machine learning intent prediction model includes a transformer model. By way of example, the machine learning intent prediction model may include one or more language models, such as a bidirectional encoder representations from transformers (BERT) models, universal sentence encoder models, and/or the like. By way of example, the machine learning intent prediction model may include a universal sentence encoder that is previously trained using one or more supervised and/or unsupervised machine learning techniques to transform a natural language query into one or more query embeddings and generate at least one intent prediction for the natural language query that is indicative of a likelihood of a target query intent.

In some embodiments, a target query intent is a data entity that describes an intent behind a query. A target query intent may include one or more intent classes of an intent classification taxonomy that are each associated with one or more different types of query results achievable through different query processing pipelines. Each query processing pipeline, for example, may be configured to generate candidate data objects that may be assigned to a query, such as a natural language query. In some examples, each intent class in an intent classification taxonomy is associated with a set of one or more data processing operations of a plurality of sets of one or more data processing operations. A target query intent may define a category of queries that may be assigned the particular intent class. By way of example, in a healthcare knowledge domain, an example target query intent may be a healthcare financial intent. The healthcare financial intent, for example, may be configured to be assigned to healthcare financial-related queries such as a health savings account balance query, a health saving account history query, a health savings account spending query, a financial savings account balance query, a financial savings account spending query, copay-related query, deductible-related query, out of pocket maxima-related query, prescription drug tiers-related query, and/or the like.

In some embodiments, an intent classification taxonomy describes a data structure for classifying a query. The intent classification taxonomy may include a plurality of intent classes that may be assigned to a query, such as a natural language query. In some embodiments, the intent classification taxonomy is associated with a particular knowledge domain. By way of example, the intent classification taxonomy may be associated with a healthcare knowledge domain.

As described above, in some embodiments, the query intent service 308 leverages a machine learning framework that includes a machine learning intent prediction model 318 and/or a machine learning event prediction model 320.

In some embodiments, a machine learning event prediction model is a data entity that describes parameters, hyperparameters, and/or defined operations of a rules-based algorithm and/or machine learning model (e.g., model including at least one or more rule-based layers, one or more layers that depend on trained parameters, coefficients, and/or the like). In some examples, the machine learning event prediction model may be configured, trained, and/or the like to generate a second prediction for a natural language query that is indicative of a likelihood of a target event. For example, the machine learning event prediction model may be configured to process a natural language query to generate one or more outputs indicative of the likelihood of each of a plurality of events. The machine learning event prediction model may include one or more of any type of machine learning model including one or more supervised, unsupervised, semi-supervised, reinforcement learning models, and/or the like. In some examples, the machine learning event prediction model may include multiple models configured to perform one or more different stages of a prediction process.

In some embodiments, the machine learning event prediction model includes a neural network, such as a recurrent neural network. In some examples, the machine learning event prediction model may include one or more recurrent neural networks that are previously trained, using one or more supervised and/or unsupervised machine learning techniques, to generate an event prediction for a natural language query. By way of example, the machine learning event prediction model may include a seq2seq model configured to generate at least one intent prediction indicative of the likelihood of a target event based on the natural language query.

In some embodiments, a target event is a data entity that describes a real-world event or a virtual event that may be predictive of a target query intent. For example, the target event may include an event that is associated with a user that provided the query. The occurrence and/or likelihood of the occurrence of the event may relate to the likelihood of a target query intent for a query submitted by the user. For example, a target event may relate to a target query intent, whereby the occurrence and/or likelihood of occurrence of the target event may increase (and/or decrease) the likelihood that a user may have a target query intent behind a submitted natural language query. By way of example, in a healthcare knowledge domain, the submission of a medical claim may increase the likelihood that a user's intent behind a natural language query is related to a medical claim, coverage for a medical claim, and/or the like. In such a case, the target query intent may be a healthcare financial intent and the example target event may include the submission of a medical claim.

In some embodiments, the query intent service 308 leverages the intent prediction output of the machine learning intent prediction model 318 and the event prediction output of the machine learning event prediction model 320 to generate an intent classification for the query. By leveraging related outputs of two machine learning models to generate an intent classification for a query, various embodiments of the present disclosure improve the accuracy of the intent classification for a query, which in turn improves the accuracy of query results. In this way, various embodiments of the present disclosure reduce the need for users to submit multiple queries and reduce the overall number of queries transmitted to query engines. As such, various embodiments of the present disclosure reduce network traffic and the operational load on query engines, thus improving operational reliability and computational efficiency of query engines.

In some embodiments, intent classification is a data entity that describes a predicted intent class, for a query, such as a natural language query, where the predicted intent class may be indicative of the intent for the query. By way of example, a predicted intent class may be predicted for a query from an intent classification taxonomy associated with a particular knowledge domain. In some embodiments, the intent classification for a query enables execution of one or more data processing operations that are specially configured for a query based on the intent classification for the query. For example, one or more specially configured data processing operations may be performed responsive to query based on the intent classification for the query. For example, a target query intent classification may prompt performance of one or more data processing operations specially configured for the query based on the target query intent classification. In this regard, executing one or more query operations that are specially configured for a query based on the intent classification for the query facilitates computing efficiency and improved accuracy of query results. In some examples, the one or more data processing operations may include analytics performed on a curated data corpus, such as a curated data corpus maintained by the data store 314.

In some embodiments, a data processing operation is a data entity that describes a computing task associated with the execution of a query. For example, a data processing operation may include data expression that may represent computing task for executing a query. A data processing operation, for example, may include a filter operation for identifying data associated with a user, a sorting operation for organizing data in accordance with one or more sorting objectives (e.g., ascending order, descending order, and/or the like), a summation operation for adding select rows of a table, such as a relational table associated with a data repository 316, a subtraction operation, a search operation for retrieving data associated with a user, and/or the like.

In some embodiments, the query engine 312 is configured to execute one or more data processing operations tailored to the intent behind the query to generate one or more candidate data objects. In some embodiments, a candidate data object includes data that represents a candidate canonical answer and/or candidate supplemental answer to a query. A candidate canonical answer may describe the specific answer to a query, while a supplemental answer may describe anticipated contextual information required by the user (e.g., answers to queries not submitted by the user but intelligently deemed by the predictive query system 302 as contextually relevant to the query). In some examples, a candidate data object may include a query descriptor that describes a query representative and a result value that represents a candidate canonical answer to the query and/or represents a candidate supplemental answer to the query. By way of example, a candidate data object may be structured as [query descriptor: result value]. In a healthcare knowledge domain for example, where a query is "how much is left in my HSA," example candidate data objects may include [Balance left in the HSA: $683.44], [Amount spent year to date in HSA: $1816.56], [Most recent HSA transaction $199.99 from Optum Store on May 13, 2022], [Deadline for spending the money in the HSA Dec. 30, 2026], [Deadline for filing claims related to the HSA: Dec. 30, 2026], and/or the like.

In some embodiments, the query engine 312 is configured to map a query to a plurality of candidate data objects generated for a query to identify relevant data objects for the query. In some embodiments, a relevant data object describes a candidate data object that includes data/or information that answers a query. In some embodiments, a relevant data object includes data/or information that corresponds to the canonical (e.g., specific) answer to the query or that corresponds to a supplemental answer to the query. In some examples, a relevant data object is identified based on a relevancy measure, such as a semantic similarity score, a syntactic similarity score, a combination thereof, and/or the like. By way of example, a relevant data object may describe a candidate data object associated with a relevancy score that satisfies a semantic similarity score threshold, a syntactic similarity score threshold, a combination thereof, and/or the like. In some embodiments, to identify relevant data objects for a query, the query engine identifies a relevancy score for each of a plurality of candidate data objects generated for the query, and identifies the relevant data objects for the query based on the relevancy score for each of the plurality of candidate data objects.

In some embodiments, a relevancy score is a data value that indicates a relevancy level of a candidate data object to a query, such as a natural language query. In some examples, the relevancy score may be indicative of a syntactic relevance and/or semantically relevance of a candidate data object to a query. For example, the relevancy score for a candidate data object may be indicative of a syntactic similarity between a candidate data object and a query. As another example, the relevancy score for a candidate data object may be indicative of a semantic similarity between the candidate data object and a query, As yet another example, the relevancy score for a candidate data object may be indicative of the syntactic similarity between a candidate data object and a query as well as the semantic similarity score between the candidate data object and the query. By way of example, the relevancy score for a candidate data object may be generated by calculating the syntactic similarity and/or semantic similarity between query embeddings for the query and the candidate data object (e.g., syntactic similarity and/or semantic similarity between embedding(s) for the query and embedding(s) for the candidate data object). In such an example, the query embeddings may be generated from deep learning models that are trained on large corpus such as, but not limited to, universal sentence encoding, BERT-based models (PubMedBERT, BioBERT etc.). Additionally, or alternatively, the relevancy score for a candidate data object may be generated from syntactic similarity and/or semantic similarity between query embeddings for a query and the candidate data object based on other techniques such as, but not limited to, Jaccard similarity, TF-IDF similarity, and/or the like. The relevancy score may provide a qualitative and/or quantitative relevance value that indicates how likely the candidate data object represents a correct query result (e.g., correct canonical answer and/or correct supplemental answer). For example, a relevancy score for a candidate data object may be predictive of a relevant data object.

In some embodiments, a query result is presented in the form of a natural language query result. For example, in some embodiments, the query engine 312 is configured to generate a natural language query result indicative of the one or more relevant data objects. In some embodiments, a query result is a data entity that describes one or more natural language terms and/or phrases. For example, the one or more natural language terms and/or phrases may form one or more sentences that define a query result expressed in a natural language. In some embodiments, the query result includes a principal query result that represents canonical answer to the query and one or more supplemental query results that represents anticipated contextually relevant supplemental answers (e.g., contextual information) to related queries not submitted by a user but intelligently deemed by the predictive query system as related to the submitted query and anticipated as needed by the user.

In some embodiments, the query engine 312 is configured to provide the query result to the user computing entity 304 via the user interface 306. As described above, the user interface 306 may represent a unified user interface that is query intent agnostic in that queries with disparate intents and/or knowledge domains may be submitted via the unified user interface. In some embodiments, the query engine 312 may be configured to generate a graphical representation of at least a portion of the query result. For example, the query engine 312 may be configured to provide to the user computing entity 304, a query result in the form of a natural language (e.g., natural language query result) and/or in the form of a graphical representation.

As described, the intent classification for a query enables the generation of candidate data objects based on one or more specially configured data processing operations in response to an intent classification that corresponds to a target query intent. As further described, in some embodiments, the query intent service 308 leverages a machine learning framework that includes a machine learning intent prediction model 318 and/or a machine learning event prediction model 320 to generate the intent classification. An example machine learning intent prediction model 318 will now further be described with reference to FIG. 4.

Figure 4:
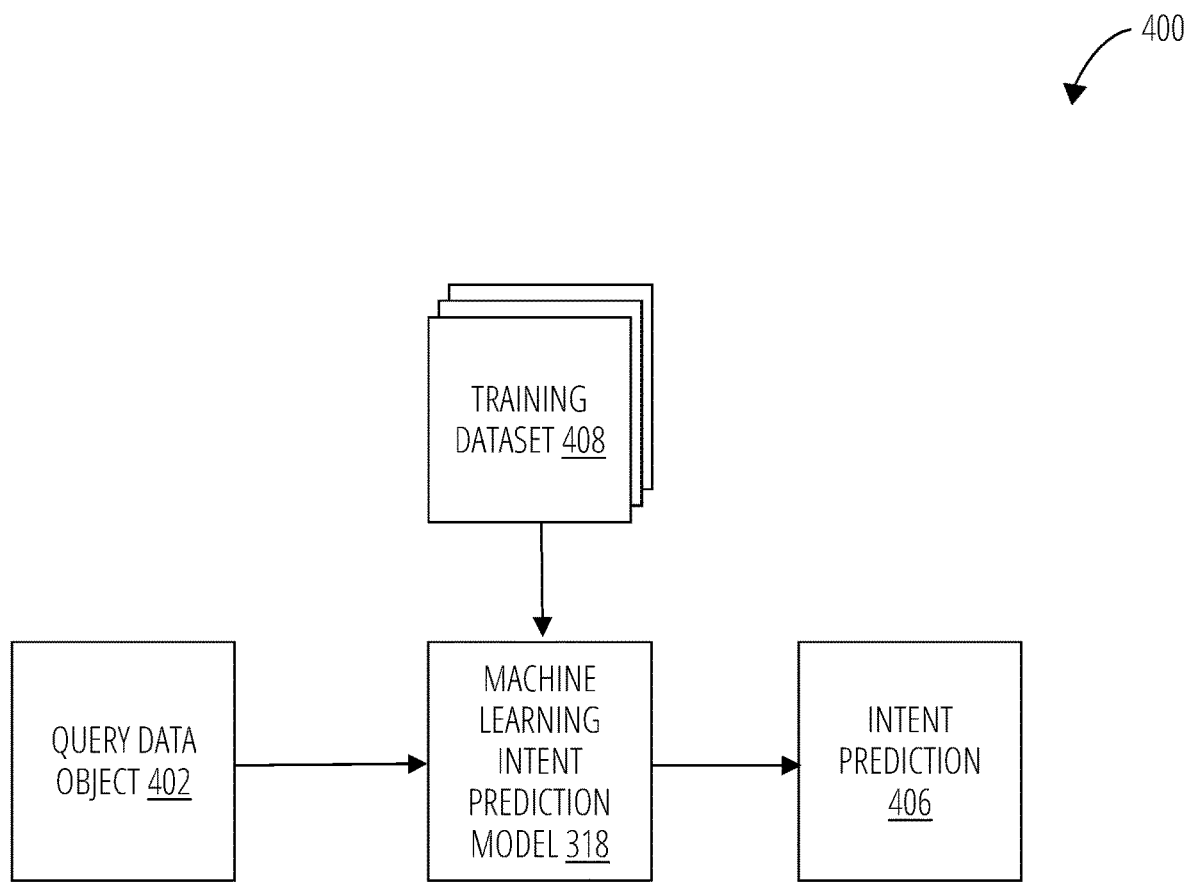
FIG. 4 illustrates an operational example of the performance of a machine learning intent prediction model in accordance with some embodiments discussed herein.

FIG. 4 provides an operational example 400 of the performance of the machine learning intent prediction model in accordance with some embodiments discussed herein. The operational example 400 depicts an example query data object 402 provided as input to the machine learning intent prediction model 318. In some embodiments, a query data object 402 includes data associated with a query, such as a natural language query. By way of example, the query data object 402 may be in the form of text string(s), numerical character(s), alphabetical character(s), alphanumeric code(s), American Standard Code for Information Interchange (ASCII) character(s), a pointer, a memory address, and/or the like.

In some embodiments, the machine learning intent prediction model 318 processes the query data object 402 to generate an intent prediction 406 indicative of a likelihood of a target query intent. In some embodiments, the machine learning intent prediction model 318 includes a transformer model. By way of example, the machine learning intent prediction model 318 may include one or more language models, such as a bidirectional encoder representations from transformers (BERT) models, universal sentence encoder models, and/or the like. The machine learning intent prediction model may include a universal sentence encoder that is previously trained using one or more supervised and/or unsupervised machine learning techniques to transform a natural language query into one or more query embeddings and generate at least one intent prediction for the natural language query that is indicative of a likelihood of a target query intent.

In some embodiments, the machine learning intent prediction model 318 has been fine-tuned over universal sentence encoding model, such as LLM universal sentence encoding model, to classify target query intent related query terms from other query terms seen by the predictive query system 302. In some examples, the machine learning intent prediction model 318 has been fine-tuned with training dataset 408 that includes a terminology corpus associated with the target query intent. In some examples, the training dataset includes supervised training data and/or unsupervised training data. The training dataset 408, may include a plurality of previous input query data objects. In some embodiments at least a subset of the plurality of previous input query data objects may be associated with a label (e.g., an intent class). For example, the training dataset may include labeled data, such as manually labeled data. In some examples, the training dataset 408 may include user-feedback data.

By way of example, an editorial team, such as subject matter experts (SEMs) and/or a machine learning model, may be employed to periodically perform one or more evaluations to generate an evaluation result dataset. In some embodiments, the evaluation result dataset may be leveraged by the predictive query system 302 to further fine-tune and/or re-train the machine learning intent prediction model 318. For example, the evaluation result dataset may be provided to the system to periodically and/or continuously fine-tune and/or re-train the machine learning intent prediction model 318.

In some examples, the editorial team and/or machine learning model may periodically evaluate a subset of previous queries received by the predictive query system 302 to identify and/or flag queries that are healthcare financial-related queries. The subset of previous queries may be representative of the population of previous queries associated with a time period. Additionally, or alternatively, the editorial team and/or a machine learning model may evaluate previous graphical representations of query results. The editorial team and/or a machine learning model may be tasked with one or more of determining whether previous query results correctly answer the respective query, determining whether the intent classification for previous query results are correct, determining whether the meaning for previous query results were correctly interpreted by the system, determining whether supplemental query results generated for previous queries are contextually relevant, determining whether previous query results fully answer the respective query, and/or the like. The evaluation results may be provided as a portion of training dataset for fine-tuning and/or re-training the machine learning intent prediction model 318. By way of example, the editorial team and/or machine learning model may assign a label (e.g., ground truth label) to a previous query and/or query result based on the evaluation result dataset.

As described above, the query processing techniques of the present disclosure may be implemented for a plurality of different knowledge domains. The configuration, type, and/or other characteristics of the machine learning intent prediction model may be dependent on the particular domain. The training dataset for training and/or fine-tuning the machine learning intent prediction models 318, for example, may depend on the knowledge domain. Continuing with the healthcare knowledge domain, in which a query result may be generated in response to a healthcare financial-related query, the machine learning intent prediction model may be fine-tuned (e.g., previously fine-tuned) over universal sentence encoding model to classify healthcare financial query terms from other query terms presented to the predictive query system 302. In such a case, the training dataset may include a terminology corpus for healthcare financial terms, such as healthcare savings account related-terms, financial savings account-related terms, health insurance deductible-related terms, healthcare copay-related terms, and/or the like. By way of example, the terminology corpus may be obtained from one or more data sources.

In some embodiments, fine-tuning the machine learning intent prediction model 318 includes generating query embeddings for previous queries in the training dataset, learning the query embeddings, and associating the query embeddings with a corresponding intent class of a plurality of intent classes. By way of example, the query embeddings may include sentence embeddings of a query. The machine learning intent prediction model 318 may be trained to predict the likelihood that the intent for a query corresponds to a target query intent based on the query embeddings for the query. For example, the machine learning intent prediction model 318 may be trained to determine the similarity between query embeddings for a query and a representation of each class and predict the likelihood that the query intent corresponds to a target query intent based on the similarity. Such similarity may include semantic similarity, syntactic similarity, cosine similarity, Euclidean distance similarity, and/or the like. In some examples, the machine learning intent prediction model 318 may include a transformer-based encoder, a deep averaging network-based encoder, and/or other encoder types.

In some embodiments, the machine learning intent prediction model 318 is trained to identify terms for a target query intent and/or identify data patterns that contribute to the likelihood of a target query intent prediction. In some embodiments, the machine learning intent prediction model 318 has been fine-tuned and/or trained on training dataset that includes a target query-intent corpus. By way of example, continuing with the healthcare knowledge domain, the machine learning intent prediction model 318 may be fined-tuned on training dataset that includes healthcare financial terms corpus. In some examples, the training dataset may include data obtained from user-feedback and/or manual labeling. In some examples, the machine learning intent prediction model 318 has been fine-tuned over the sentence encoding model to generate a query embedding for each sentence in a query and identify query embeddings associated with the target query intent.

In some embodiments, the machine learning intent prediction model 318 is trained to output an initial target query intent prediction. As described herein, the initial target query intent prediction may be refined using one or more outputs from a second machine learning model, such as the machine learning event prediction model. An example machine learning event prediction model will now further be described with reference to FIG. 5.

Figure 5:
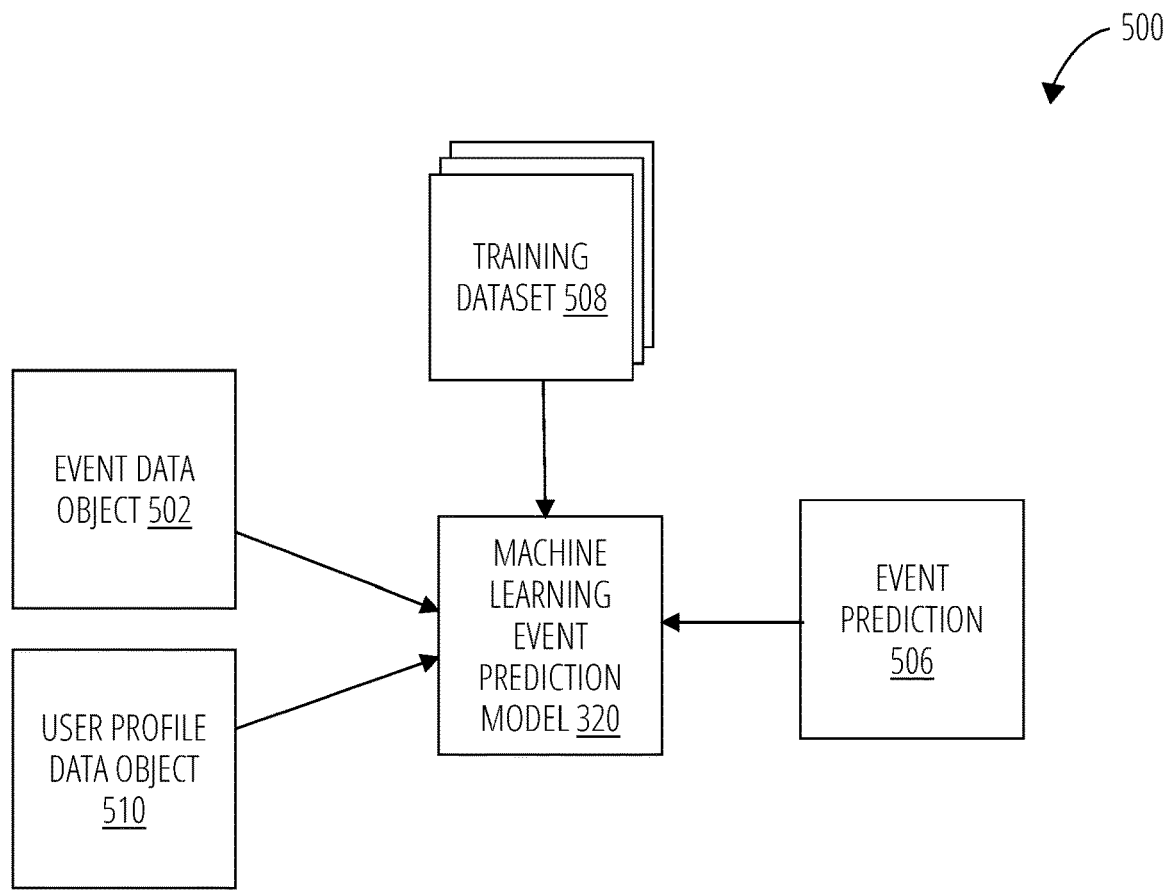
FIG. 5 illustrates an operational example of the performance of a machine learning event prediction model in accordance with some embodiments discussed herein.

FIG. 5 provides an operational example 500 of the performance of the machine learning event prediction model in accordance with some embodiments discussed herein.

In some embodiments, the machine learning event prediction model includes a neural network, such as a recurrent neural network. In some examples, the machine learning event prediction model may include one or more recurrent neural networks that are previously trained, using one or more supervised and/or unsupervised machine learning techniques, to generate an event prediction for a natural language query. By way of example, the machine learning event prediction model may include a seq2seq model configured to generate at least one intent prediction indicative of the likelihood of a target event based on the natural language query. For example, the machine learning event prediction model 320 may include a seq2seq model that includes one or more of recurrent neural networks (RNN) encoder(s), RNN decoder(s), long-short term memory (LSTM) encoder(s), LSTM decoders, and/or the like to facilitate generating an event prediction. In some examples, the encoder(s) may be configured to generate a hidden state vector(s) that capture the context of an input sequence. In some embodiments, the encoder(s) may then pass the hidden state vector(s) to the decoder(s). The decoder(s) may be configured to generate an output sequence based on the hidden state vector(s) received from the encoder(s). In some embodiments, the noted input sequence is an input sequence of an event data object. In some embodiments, an event data object describes a data object that includes a sequence of previous target events. For example, an event data object may include data associated with a plurality of previous target events for a user arranged in a sequential order. In some embodiments, the machine learning event prediction model 320 is trained using a masked language model technique to generate the likelihood of a target event occurring within a specified time period in the future. The machine learning event prediction model 320 may be trained to receive input data that includes an event data object and/or user profile data associated with a query. In some embodiments, examples of user profile data include socio-economic data of the user, query history of the user, previous queries submitted by the user, and/or the like. In some embodiments, the machine learning event prediction model 320 is trained to output an event prediction based on the input data. In some examples, embeddings of the user profile data (e.g., socio-economic embeddings such as zip-code embeddings, query history embeddings, query embeddings, and/or the like) are leveraged at a final fully convolutional (FCN) layer of the model to improve the prediction output of the machine learning event prediction model 320.

The operational example 500 depicts an example event data object 502 associated with the query. By way of example, the event data object 502 may be associated with the user that submitted the query. The event data object 502 may be provided as input to the machine learning event prediction model 320. The machine learning event prediction model 320 may process the event data object to generate an event prediction indicative of a likelihood of a target event that is associated with the target query intent. As described above, in some embodiments, an event data object includes data associated with a plurality of previous target events for a user in a sequential order.

In some embodiments, a user profile data object 510 associated with the query may be provided as input to the machine learning event prediction model 320 in addition to the event data object 502. In some examples, the user profile data object 510 may include data associated with the user, such as socio-economic data, query history, previous queries, and/or the like. In some embodiments, the machine learning event prediction model 320 has been trained on a training dataset 508 to generate an event prediction based on event data object and/or a user profile data object. In some examples, the training dataset 508 includes supervised training data and/or unsupervised training data. The training dataset 508, may include a plurality of previous event data objects 502 and/or a plurality of previous user profile data objects 510 associated with one or more users. In some embodiments at least a subset of the plurality of previous event data objects and/or the plurality of previous user profile data objects 510 may be associated with a label (e.g., an event prediction). For example, the training dataset may include labeled data, such as manually labeled data.

As described above, the query processing techniques of the present disclosure may be implemented for a plurality of different knowledge domains. The configuration, type, and/or other characteristics of the machine learning event prediction model 320 may be dependent on the particular knowledge domain. The training dataset for training and/or fine-tuning the machine learning event prediction model 320, for example, may depend on the knowledge domain. Continuing with the healthcare knowledge domain, in which a query result may be generated in response to a healthcare financial-related query, the machine learning event prediction model 320 may be trained using a training dataset 508 that includes previous medical claims associated with the user that initiated the query, and/or user profile data associated with the user. In such a case, training the machine learning event prediction model 320 may include retrieving data associated with previous medical claims for a plurality of users, evaluating the medical claims, and selecting the medical claims that satisfy a set of criteria as part of the training dataset. By way of example, the set of criteria may include medical claims having a value that is greater than a certain amount (e.g., 0, 300, and/or the like), medical claims submitted within a particular time period (e.g., number of users who have at least twelve medical claim submission records in a particular year or years). In the noted example, medical claims that satisfy the set of criteria may be sequentially ordered to generate a plurality of event data objects that each include the medical claims for a corresponding user in a sequential order. For example, the medical claims that satisfy the set of criteria may be sequentially ordered by start date. The medical claims that satisfy the set of criteria may be adopted as a portion of the training dataset 508 and may be leveraged, alone or with corresponding user profile data objects 510, to train the machine learning event prediction model 320. In the noted example, the machine learning event prediction model 320 may be trained to generate an event prediction indicative of the likelihood of a medical claim submission occurring with a certain time period in the future (e.g., 30 days, 2 months, and/or the like).

As described above, in some embodiments, the predictive query system 302 is configured to facilitate intent-driven query processing scheme for intelligently generating optimized query results, such as in a complex knowledge domain. An example of an intent-driven query processing scheme will now further be described with reference to FIG. 6.

Figure 6:
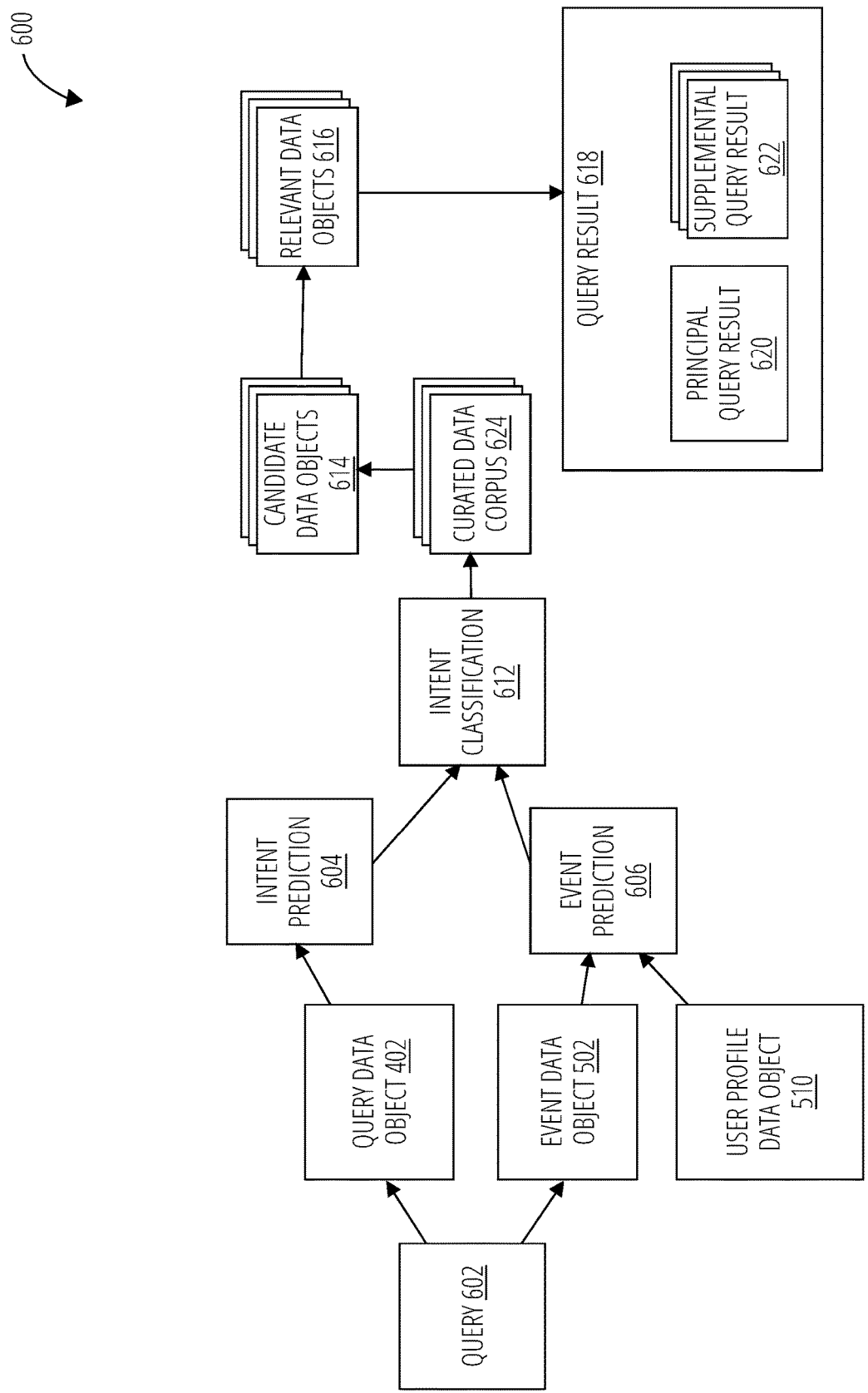
FIG. 6 is a dataflow diagram showing example data structures for facilitating generation of optimized query results in accordance with some embodiments discussed herein.

FIG. 6 is a dataflow diagram 600 showing example data structures for facilitating generation of optimized query results in accordance with some embodiments discussed herein. The dataflow diagram 600 depicts a set of data structures and computing entities for generating an optimized query result 618 that includes a principal query result 620 and supplemental query result 622. In some embodiments, a principal query result provides a canonical/specific answer to a query. In some embodiments, a supplemental query result provides contextually relevant information indicative of answers to queries not submitted by a user but anticipated by the predictive query system as contextually relevant to the query. A supplemental query result, for example, may include anticipated contextually relevant information required by the user associated with the query. In some embodiments, by providing anticipated contextually relevant answers (e.g., supplemental query results) in response to a query, some embodiments of the present disclosure obviate the need for a user to submit multiple queries to a query engine and/or submit multiple queries to achieve the user's intent for the initial query submitted. By doing so, some embodiments of the present disclosure improve query processing technology and reduce network traffic.

In some embodiments, a query 602 is received from a user computing entity. In some embodiments, the query 602 is a natural language query. In some embodiments, a natural language query is a data entity that describes one or more natural language terms and/or phrases. For example, the one or more natural language terms and/or phrases may form one or more sentences that define a question expressed in a natural language.

In some embodiments, a query data object 402 is used to generate an intent prediction 604 for the query 602. In some embodiments, a query data object is a data object that includes data associated with a query, such as a natural language query. In some embodiments, an intent prediction 604 is a data entity that describes a machine learning output indicative of a likelihood of a target query intent. In some embodiments, to generate an intent prediction 604, the query data object 402 is parsed and one or more query embeddings are generated based on terms, phrases, sentences, and/or the like identified from parsing the query data object 402.

In some embodiments, an event data object 502 is generated based on the query 602. The event data object 502 may include previous target event(s) associated with the user that initiated the query 602. In a healthcare knowledge domain, for example, previous target events may include previous medical claims associated with the user. In some embodiments, an event prediction 606 may be generated for the query 602 based on the event data object 502 and/or a user profile data object 510 associated with the user. The user profile data object 510 may include data associated with the user, such as socio-economic data, query history, previous queries, and/or the like.

In some embodiments, the intent prediction 604 and/or the event prediction 606 is leveraged to generate an intent classification 612 for the query 602. In some embodiments, an intent classification 612 is a data entity that describes a predicted intent class for a query, such as a query 602. The predicted intent class may be indicative of the intent for the query.

In some embodiments, in response to the intent classification 612 corresponding to a target query intent, a plurality of candidate data objects 614 are generated. In some embodiments, a curated data corpus 624 associated with a plurality of users is leveraged to generate the plurality of candidate data objects 614. In some embodiments, an identifier associated with the query 602 is used to identify data from the curated data corpus 624 that is associated with the user that submitted the query 602. The identifier may describe a data entity that uniquely identifies the user that submitted the query. In some embodiments, the identifier may be determined based on the log-in information provided by the user during initiation of the query 602.

In some embodiments, one or more of the candidate data objects 614 represents a candidate canonical answer for the query 602. In some embodiments, a subset of the candidate data objects 614 represents candidate supplemental answer to a query 602. The candidate data object may be generated based on performing one or more data processing operations that is specially configured for the query based on the intent classification 612 for the query. In some examples, a candidate data object includes a query descriptor that describes a query representative and a result value that represents a candidate canonical answer to the query and/or represents a candidate supplemental answer to the query. For example, a candidate data object that represents a candidate canonical answer for the query 602 may include a query descriptor that corresponds to the candidate canonical answer to the query, while a candidate data object that represents a candidate supplemental answer to the query 602 may include a query descriptor that corresponds to a candidate supplemental answer to the query 602. By way example, the candidate data object may be structured as [query descriptor: result value]. In a healthcare knowledge domain, for example, where a query is "how much is left in my HSA," an example candidate data object that represents a candidate canonical answer may include [How much is left in HSA: $683.44], while candidate data objects that represent candidate supplemental answers may include [Amount spent year to date in HSA: $1816.56], [Most recent HSA transaction: $199.99 from Optum Store on May 13, 2022], and/or the like.

As described above, in some embodiments, the plurality of candidate data objects 614 is generated based on performing a set of one or more data processing operations associated with the target intent class. In some embodiments, the set of one more data processing operations includes performing analytics on a curated data corpus 624 maintained in a data repository, such as a relational database. The curated data corpus 624 may include records of qualifying events (as described above) associated with a plurality of users.

In some embodiments, the one or more data processing operations may include a search operation for identifying data associated with a user; a filter operation for identifying, from the curated data corpus 624, data associated with the user; a sorting operation for organizing data associated with the user in accordance with a sorting objective (e.g., ascending order, descending order, and/or the like); a summation operation for adding select rows of a relational table associated with the user, a subtraction operation, and/or the like.

As an example, in response to an intent classification that corresponds to a target intent classification, one or more data processing operations, such as analytics, may be performed to generate a first candidate data object. By way of example, in the healthcare knowledge domain, where the target query intent is a healthcare financial intent, the first candidate data object may be a candidate data object that answers the query "how much is left in my HSA." To generate the first candidate data object, a search operation may be performed based on an identifier associated with the query 602 to identify, from the curated data corpus 624, data (e.g., qualifying event records) associated with the user that submitted the query. The identifier may be configured to uniquely identify the user associated with the query. A first set of one or more filtering operations may then be performed on the table rows associated with the identifier. The first set of one or more filtering operations may include filtering for rows with a transaction date corresponding to the present day or earlier and filtering for rows associated with "member HSA" debit account type. A first summation operation may then be performed on the "amount" table column to generate a first value (e.g., "total debits value"). A second set of one or more filtering operations may be performed on the table rows associated with the identifier. The second set of one or more filtering operations may include filtering for rows with a transaction date corresponding to the present day or earlier and filtering for rows associated with "member HSA" credit account type. A second summation operation may then be performed on the "amount" table column to generate a second value. A subtraction operation may be performed on the first value and second value (e.g., subtract the second value from the first value) to generate a final value that is responsive to the query "how much is left in my HSA."

By way of example, in the healthcare knowledge domain, where the target query intent is a healthcare financial intent, a second candidate data object may be a candidate data object that answers the query "most recent HSA transaction." To generate the second candidate data object, a filtering operation may be performed on the table rows associated with the identifier to filter for rows associated with "member HSA" credit account type. A sorting operation may then be performed to sort the rows by transaction date to determine the most recent transaction date, the corresponding amount, the debit account name, a user-friendly description of the merchant provider for that particular HSA transaction, and/or the like.

By way of example, in the healthcare knowledge domain, where the target query intent is a healthcare financial intent, a third candidate data object may be a candidate data object that answers the query "how much have I spent in my FSA so far this year." To generate the third candidate data object, a filtering operation may be performed to filter for rows associated with a transaction date on or greater than January 1 of the current year. A filtering operation may then be performed to filter for rows associated with "member FSA" credit account type. A summation operation may then be performed on the "amount" table column to generate a value that answers the query "how much have I spent in my FSA so far this year"

Upon generating the candidate data objects 614, one or more relevant data objects 616 are identified based on the candidate data objects 614. For example, one or more candidate data objects from the plurality of candidate data objects 614 may be adopted as the one or more relevant data objects 616 based on a relevancy score associated with the candidate data objects 614.

In some embodiments, the relevancy score is a semantic similarity score, a syntactic similarity score, and/or a combination (e.g., average, sum, and/or the like) of semantic similarity score and a syntactic similarity score. In some embodiments, a relevant data object 616 includes a candidate data object that is associated with a relevancy score that satisfies a semantic similarity score threshold, a syntactic similarity score threshold, or combination thereof, and/or the like. In some embodiments, a particular relevant data object of the one or more relevant data objects 616 represents a principal search result indicative of a canonical answer to the query. In some embodiments, a particular relevant data object of the one or more relevant data objects 616 represents a supplemental query results indicative of contextually relevant information with respect to the query.

In some embodiments, the one or more relevant data objects 616 is used to generate a query result 618. In some embodiments, the query result 618 includes a natural language query result that is indicative of the one or more relevant data objects 616. In some embodiments, the query result 618 includes a principal query result 620 and a supplemental query result 622. Additionally, or alternatively, in some embodiments, the query result 618 includes a graphical representation of at least a portion of the query result 618.

In some embodiments the query result 618 is provided via a user interface. An example of such user interface will now further be described with reference to FIG. 7.

Figure 7:
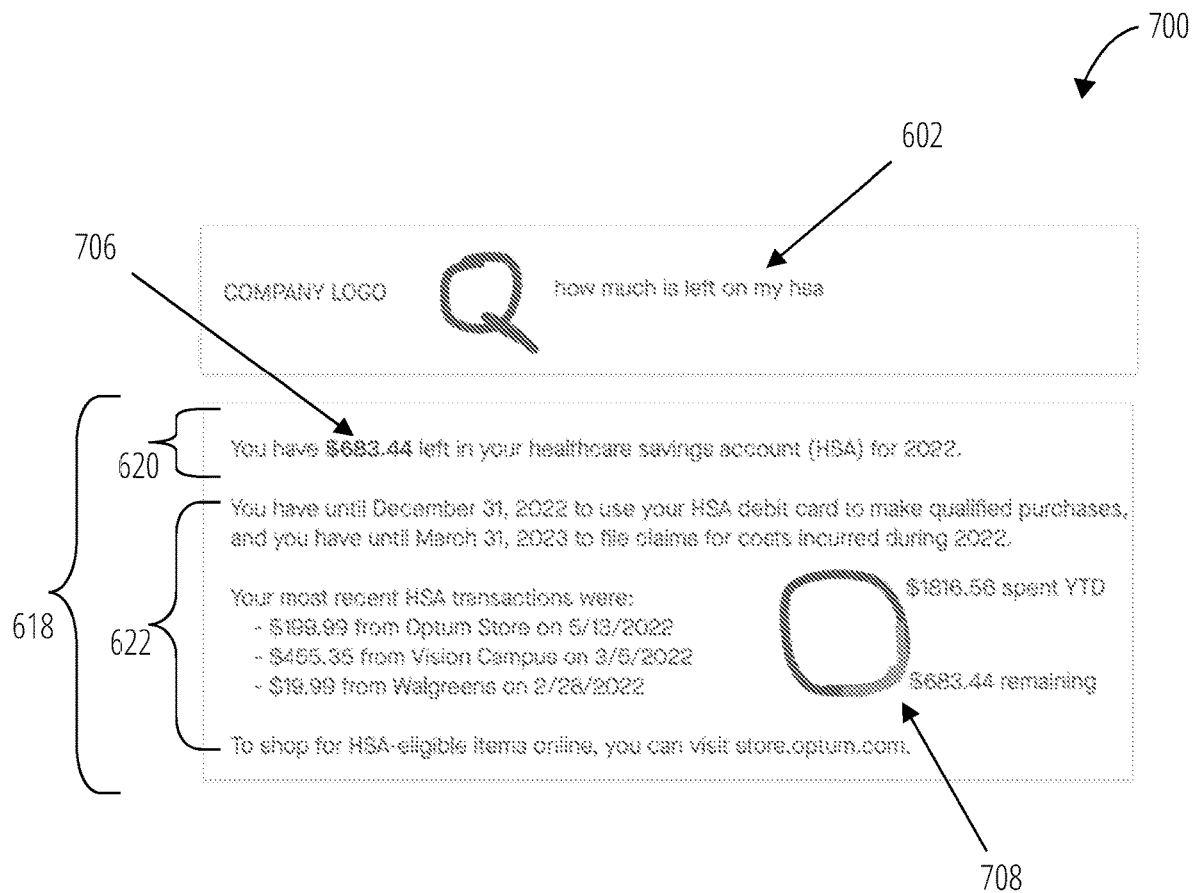
FIG. 7 illustrates an example user interface displaying an example query result in accordance with some embodiments discussed herein.

FIG. 7 illustrates an example user interface 700 (such as user interface 306) displaying an example optimized query result in accordance with some embodiments discussed herein. In some embodiments, user interface 700 is a sub-user interface. (such as sub-user interface of user interface 306). As depicted in FIG. 7, the user interface includes an example query 602 submitted to the predictive query system, and an example natural language query result 618. As depicted in FIG. 7, the query result 618 includes an example principal query result 620 presented in natural language and a plurality of example supplemental query results 622 presented in natural language. As depicted in FIG. 7, the principal query result 620 includes a result value 706 generated from performing analytics on a curated data corpus, such as curated data corpus 624. As further depicted in FIG. 7, the user interface 700 includes a graphical representation 708 of at least a portion of the query result.

Figure 8:
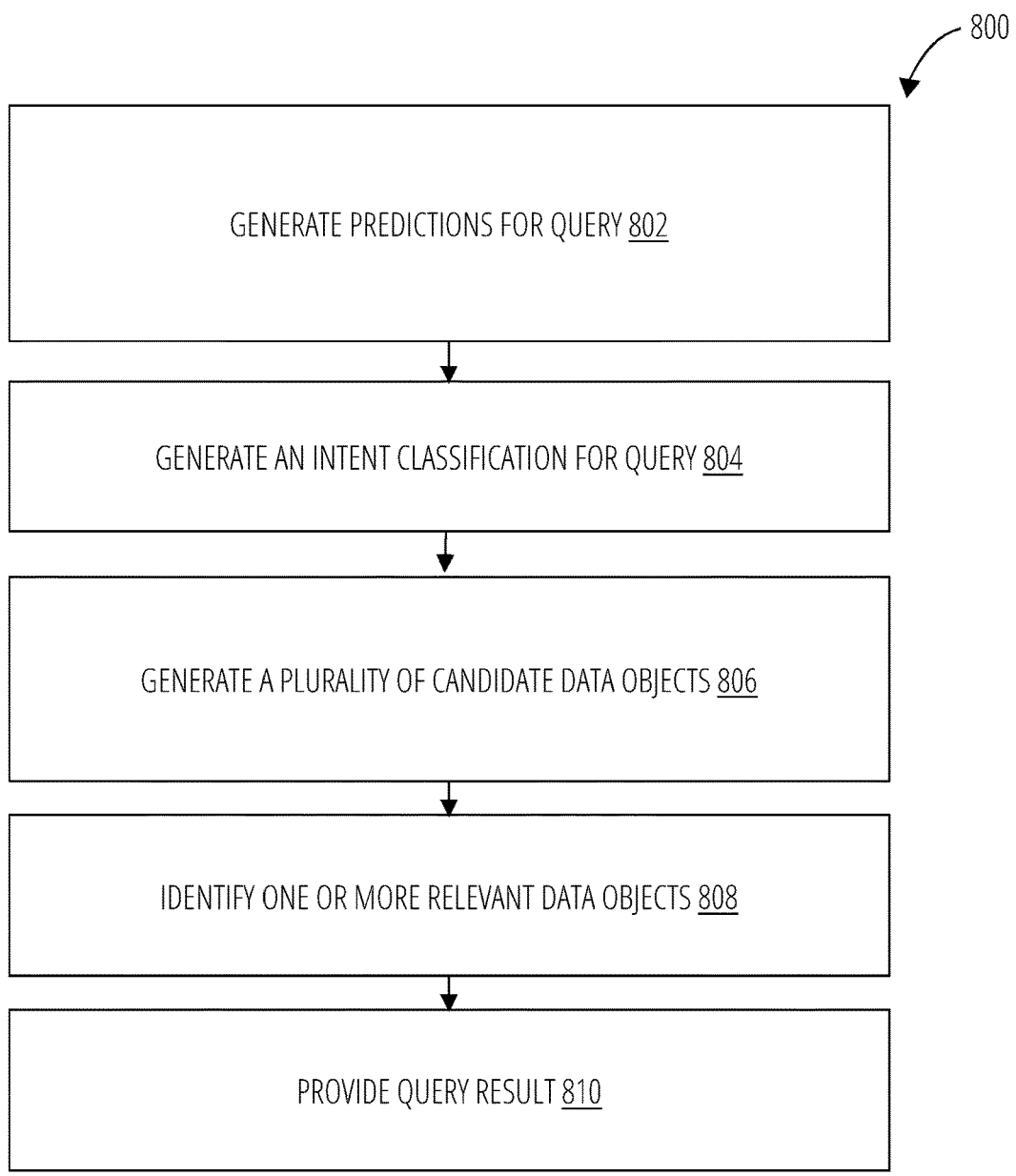
FIG. 8 is a flowchart showing an example of a process for generating query results in accordance with some embodiments discussed herein.

FIG. 8 is a flowchart showing an example of a process 800 for generating query results in accordance with some embodiments discussed herein. The flowchart depicts query processing techniques for generating optimized query results to overcome various limitations of conventional query engines. The query processing techniques may be implemented by one or more computing devices, entities, and/or systems described herein. For example, via the various steps/operations of the process 800, the computing system 100 may leverage the query processing techniques to overcome the various limitations with conventional query engines by performing specially configured data processing operations on a curated data corpus to generate optimized query results tailored to the intent underlying a query and anticipating the predicted needs of a user.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, generating, using a machine learning framework, one or more predictions for a natural language query. For example, the computing system 100 may generate the one or more predictions. The one or more predictions may include an intent prediction indicative of a likelihood of a target query intent and an event prediction indicative of a likelihood of a target event that is associated with the target query intent. For example, the computing system 100 may determine using a machine learning framework one or more predictions for the natural language query. The one or more predictions may include an intent prediction indicative of a likelihood of a target query intent. Additionally, or alternatively, the one or more predictions may include an event prediction indicative of a likelihood of a target event that is associated with the target query intent. In some embodiments, the machine learning framework includes a machine learning intent prediction model configured to generate the intent prediction. In some embodiments, the machine learning event prediction model is configured to generate the event prediction. In some embodiments, the machine learning intent prediction model includes a universal sentence encoding model. In some embodiments, the machine learning event prediction model includes a seq2seq model.

In some embodiments, the natural language query is received from a user via a query interface. In some embodiments, the query interface is a unified user interface. For example, the computing entity may receive the natural language query via a unified user interface.

In some embodiments, the process 800 includes, at step/operation 804, generating an intent classification for the natural language query based on the intent prediction and the event prediction. For example, the computing system 100 may generate an intent classification for the natural language query based on the intent prediction and the event prediction. For example, the computing system 100 may aggregate the intent prediction and the event prediction to generate the intent classification.

In some embodiments, the process 800 includes, at step/operation 806, in response to the intent classification corresponding to the target query intent, generating a plurality of candidate data objects based on an identifier associated with the natural language query. For example, in response to an intent classification corresponding to the target query intent, the computing system 100 may generate a plurality of candidate data objects based on an identifier associated with the natural language query. In some embodiments, the identifier associated with the natural language query includes a user identifier corresponding to the user. In some embodiments generating the plurality of candidate data objects includes performing analytics on a curated data corpus based on the identifier. In some embodiments, the curated data corpus includes event data for qualifying events associated with the users. In some embodiments, the computing system 100 receives event data associated with one or more qualifying events for a user and updates the curated data corpus based on the event data.

In some embodiments, the process 800 includes, at step/operation 808, identifying one or more relevant data objects from the plurality of candidate data objects based on a relevancy score for each of the plurality of candidate data objects. For example, the computing system 100 may identify the one or more relevant data objects from the plurality of candidate data objects based on a relevancy score for each of the plurality of candidate data objects. In some embodiments, the computing system 100 generates the relevancy score for each of the plurality of candidate data object based on a plurality of syntactic similarity scores and a plurality of semantic similarity scores.

In some embodiments, to generate the relevancy score, the computing system 100 generates one or more query embeddings for the query. The computing system 100, in some embodiments generates a plurality of syntactic similarity scores between the natural language query and the plurality of candidate data objects based on the one or more query embeddings. The computing system 100, in some embodiments, generates a plurality of semantic similarity scores between the natural language query and the plurality of candidate data objects based on the one or more query embeddings. In some embodiments, the computing system 100 generates the relevancy score for each of the plurality of candidate data objects based on the plurality of syntactic similarity scores and/or the plurality of semantic similarity scores.

In some embodiments, the process 800 includes, at step/operation 810, providing, via a user interface, a natural language query result for the natural language query. For example, the computing system 100 may provide the natural language query result. The natural language query result may be indicative of the one or more relevant data objects. For example, the computing system 100 may generate a natural language query result for the natural language query. The natural language query result may comprise a principal query result indicative of a canonical answer to the query, and one or more supplemental query results indicative of contextually relevant information. The contextually relevant information may represent answers to related queries not submitted by the user but deemed contextually relevant by the predictive query system. In some embodiments, the computing system 100 provides for display via the query interface, a graphical representation of at least a portion of the query result.

In this manner, a machine learning framework may be leveraged to facilitate intent-driven query processing in complex knowledge domains. Unlike conventional query engines that are limited to static results sets for a particular a sequence text and devoid of contextually relevant information for a user, the process 800 may leverage the machine learning framework to generate a user interface built into user experience and configured for displaying query results in a natural language form and/or graphical representation form. In this way, the user interface facilitates ease of navigation and understanding of complex subject matters in a complex knowledge domain.

As described herein, the machine learning framework enables the generation of a new data structure, an intent classification for a query, that drives the data processing pipeline for a particular query. The process 800 leverages the intent classification to execute specially configured data processing operations tailored to a predicted intent of a query to generate intent-driven query results that are personalized, accurate, and comprehensive. In this way, the query processing techniques of the present disclosure may be practically applied to any knowledge domain to improve performance and reduce costs and latencies relative to conventional query processing technology.

Some techniques of the present disclosure enable the generation of action outputs, such as the presentation of the user interface at step/operation 810, that may be performed to initiate one or more predictive actions to achieve real-world effects. The machine learning techniques of the present disclosure may be used, applied, and/or otherwise leveraged to generate intent classifications, comprehensive query results, and/or representations thereof. These outputs may be leveraged to initiate the performance of various computing tasks that improve the performance of a computing system (e.g., a computer itself, etc.) with respect to various predictive actions performed by the computing system.

In some examples, the computing tasks may include predictive actions that may be based on a knowledge domain. A knowledge domain may include any environment in which computing systems may be applied to achieve real-world insights, such as predictions, and initiate the performance of computing tasks, such as predictive actions, to act on the real-world insights. These predictive actions may cause real-world changes, for example, by controlling a hardware component, providing targeted alerts, automatically allocating computing or human resources, and/or the like.

Examples of knowledge domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated server load balancing actions, automated computing resource allocation actions, automated adjustments to computing and/or human resource management, and/or the like.

As one example, a knowledge domain may include a clinical knowledge domain. In such a case, the predictive actions may include automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, and/or the like.

In some embodiments, the computing tasks are applied to initiate the performance of one or more predictive actions. As described herein, the predictive actions may depend on the knowledge domain. In some examples, the computing system 100 may leverage the machine learning framework to generate one or more intent classification and/or comprehensive query results. Using the intent classifications and/or comprehensive query results, the computing system 100 may generate an action output that is personalized and tailored to a user at a particular moment in time. These predictive insights may be leveraged to initiate the performance of the one or more predictive actions within a respective knowledge domain. By way of example, the knowledge domain may include a clinical knowledge domain and the one or more predictive actions may include performing a resource-based action (e.g., allocation of resource), generating a diagnostic report, generating action scripts, generating alerts or messages, generating one or more electronic communications, and/or the like. The one or more predictive actions may further include displaying visual renderings of the aforementioned examples of predictive actions in addition to values, charts, and representations associated with the third-party data sources and/or third-party datasets thereof.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method comprising generating, by one or more processors and using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generating, by the one or more processors, an intent classification for the natural language query based on the intent prediction and the event prediction; in response to the intent classification corresponding to the target query intent: generating, by the one or more processors, a plurality of candidate data objects based on an identifier associated with the natural language query; identifying, by the one or more processors, one or more relevant data objects from the plurality of candidate data objects based on a relevancy score for each of the plurality of candidate data objects; and providing, by the one or more processors and via a user interface, a natural language query result for the natural language query, wherein the natural language query result is indicative of the one or more relevant data objects.

Example 2. The computer-implemented method of example 1, further comprising receiving, via the user interface, the natural language query from a user, wherein the identifier associated with the natural language query comprises a user identifier corresponding to the user.

Example, 3. The computer-implemented method of example 1 or 2, wherein the machine learning framework comprises (i) a machine learning intent prediction model configured to generate the intent prediction, and (ii) a machine learning event prediction model configured to generate the event prediction.

Example 4. The computer-implemented method of example 3, wherein the machine learning intent prediction model comprises a universal sentence encoding model.

Example 5. The computer-implemented method of examples 3 or 4, wherein the machine learning intent prediction model is previously trained using one or more supervised training techniques.

Example 6. The computer-implemented method of any of examples 3 through 5, wherein the machine learning event prediction model comprises a seq2seq model.

Example 7. The computer-implemented method of any of examples 3 through 6, wherein identifying the one or more relevant data objects comprises: generating one or more query embeddings for the natural language query; generating a plurality of syntactic similarity scores between the natural language query and the plurality of candidate data objects based on the one or more query embeddings; generating a plurality of semantic similarity scores between the natural language query and the plurality of candidate data objects based on the one or more query embeddings; and generating the relevancy score for each of the plurality of candidate data objects based on the plurality of syntactic similarity scores and the plurality of semantic similarity scores.

Example 8. The computer-implemented method of any of the preceding examples, further comprising providing for display via the user interface, a graphical representation of at least a portion of the natural language query result.

Example 9. The computer-implemented method of any of the preceding examples, wherein generating the plurality of candidate data objects comprises performing analytics on a curated data corpus based on the identifier.

Example 10. The computer-implemented method of any of the preceding examples, wherein the computer-implemented method further comprises receiving event data associated with one or more qualifying events; and updating the curated data corpus based on the event data.

Example 11. The computer-implemented method of any of the preceding examples, wherein the natural language query result comprises (i) a principal query result indicative of a canonical answer to the natural language query, and (ii) one or more supplemental query results indicative of contextually relevant information with respect to the natural language query.

Example 12. A computing apparatus comprising memory and one or more processors communicatively coupled to the memory, the one or more processors configured to: generate, using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generate an intent classification for the natural language query based on the intent prediction and the event prediction; in response to the intent classification corresponding to the target query intent: generate a plurality of candidate data objects based on an identifier associated with the natural language query; identify one or more relevant data objects from the plurality of candidate data objects based on a relevancy score for each of the plurality of candidate data objects; and provide, by the one or more processors and via a user interface, a natural language query result for the natural language query, wherein the natural language query result is indicative of the one or more relevant data objects.

Example 13. The computing apparatus of example 12, wherein the one or more processors is further configured to: receive, via the user interface, the natural language query from a user, wherein the identifier associated with the natural language query comprises a user identifier corresponding to the user.

Example 14. The computing apparatus of example 12 or 13, wherein the machine learning framework comprises (i) a machine learning intent prediction model configured to generate the intent prediction, and (ii) and a machine learning event prediction model configured to generate the event prediction.

Example 15. The computing apparatus of example 14, wherein the machine learning intent prediction model comprises a universal sentence encoding model.

Example 16. The computing apparatus of any of examples 14 or 15, wherein the machine learning intent prediction model is previously trained using one or more supervised training techniques.

Example 17. The computing apparatus of any of claims 14 through 16, wherein the machine learning event prediction model comprises a seq2seq model.

Example 18. The computing apparatus of any of examples 14 through 17, wherein identifying the relevancy score for each candidate data objects comprises: generating one or more query embeddings for the natural language query; generating a plurality of syntactic similarity scores between the natural language query and the plurality of candidate data objects based on the one or more query embeddings; generating a plurality of semantic similarity scores between the natural language query and the plurality of candidate data objects based on the one or more query embeddings; and generating the relevancy score for each of the plurality of candidate data objects based on the plurality of syntactic similarity scores and the plurality of semantic similarity scores.

Example 19. The computing apparatus of any of the preceding examples, wherein the one or more processors is further configured to: provide for display via the user interface, a graphical representation of at least a portion of the natural language query result.

Example 20. One or more non-transitory computer-readable storage media including instructions that, when executed by one or more processors, cause the one or more processors to: generate, using a machine learning framework, one or more predictions for a natural language query, wherein the one or more predictions comprise (i) an intent prediction indicative of a likelihood of a target query intent and (ii) an event prediction indicative of a likelihood of a target event that is associated with the target query intent; generate an intent classification for the natural language query based on the intent prediction and the event prediction; in response to the intent classification corresponding to the target query intent: generate a plurality of candidate data objects based on an identifier associated with the natural language query; identify one or more relevant data objects from the plurality of candidate data objects based on a relevancy score for each of the plurality of candidate data objects; and provide, by the one or more processors and via a user interface, a natural language query result for the natural language query, wherein the natural language query result is indicative of the one or more relevant data objects.

The invention claimed is:

1. A computer-implemented method comprising:
generating, by one or more processors, using a first machine learning model of a machine learning framework, and for a natural language query, an intent prediction that identifies a likelihood of a target query intent, wherein the intent prediction is based on a transformation of the natural language query into a query embedding;
generating, by the one or more processors, using a second machine learning model of the machine learning framework, and for the natural language query, an event prediction that identifies a likelihood of a target event that is associated with the target query intent, wherein the event prediction is based on a hidden state vector of a plurality of previous target events associated with an identifier corresponding to the natural language query;
generating, by the one or more processors, an intent classification for the natural language query based on the intent prediction and the event prediction; and
in response to the intent classification corresponding to the target query intent:
determining, by the one or more processors and based on the intent classification, a relevant data object from a plurality of candidate data objects based on a relevancy score between the relevant data object and the natural language query; and
providing, by the one or more processors and via a user interface, a natural language query result for the natural language query that identifies the relevant data object.

2. The computer-implemented method of claim 1, further comprising:
receiving, by the one or more processors and via the user interface, the natural language query from a user, wherein the identifier corresponding to the natural language query comprises a user identifier for the user.

3. The computer-implemented method of claim 1, wherein the first machine learning model is a universal sentence encoding model.

4. The computer-implemented method of claim 1, wherein the first machine learning model is previously trained using one or more supervised training techniques.

5. The computer-implemented method of claim 1, wherein the second machine learning model comprises a seq2seq model.

6. The computer-implemented method of claim 1, further comprising:
generating the query embedding for the natural language query;
generating a syntactic similarity score between the natural language query and the relevant data object based on the query embedding;
generating a semantic similarity score between the natural language query and the relevant data object based on the query embedding; and
generating the relevancy score based on the syntactic similarity score and the semantic similarity score.

7. The computer-implemented method of claim 1, further comprising:
providing, by the one or more processors and for display via the user interface, a graphical representation of at least a portion of the natural language query result.

8. The computer-implemented method of claim 1, wherein the plurality of candidate data objects is determined from a curated data corpus based on the identifier.

9. The computer-implemented method of claim 8, wherein the computer-implemented method further comprises:
receiving event data associated with one or more qualifying events; and
updating the curated data corpus based on the event data.

10. The computer-implemented method of claim 1, wherein the natural language query result comprises: (i) a principal query result indicative of a canonical answer to the natural language query, and (ii) one or more supplemental query results indicative of contextually relevant information with respect to the natural language query.

11. A system comprising:
memory; and
one or more processors communicatively coupled to the memory, the one or more processors configured to:
generate, using a first machine learning model of a machine learning framework, and for a natural language query, an intent prediction that identifies a likelihood of a target query intent wherein the intent prediction is based on a transformation of the natural language query into a query embedding;
generate, using a second machine learning model of the machine learning framework, and for the natural language query, an event prediction that identifies a likelihood of a target event that is associated with the target query intent, wherein the event prediction is based on a hidden state vector of a plurality of previous target events associated with an identifier corresponding to the natural language query;
generate an intent classification for the natural language query based on the intent prediction and the event prediction; and in response to the intent classification corresponding to the target query intent:
determine, based on the intent classification, a relevant data object from a plurality of candidate data objects based on a relevancy score between the relevant data object and the natural language query; and
provide, via a user interface, a natural language query result for the natural language query that identifies the relevant data object.

12. The system of claim 11, wherein the one or more processors are further configured to:
receive, via the user interface, the natural language query from a user, wherein the identifier corresponding to the natural language query comprises a user identifier for the user.

13. The system of claim 11, wherein the first machine learning model is a universal sentence encoding model.

14. The system of claim 11, wherein the first machine learning model is previously trained using one or more supervised training techniques.

15. The system of claim 11, wherein the second machine learning model comprises a seq2seq model.

16. The system of claim 11, wherein, to determine the relevancy score, the one or more processors are further configured to:
generate the query embedding for the natural language query;
generate a syntactic similarity score between the natural language query and the relevant data object based on the query embedding;
generate a semantic similarity score between the natural language query and the relevant data object based on the query embedding; and
generate the relevancy score based on the syntactic similarity score and the semantic similarity score.

17. The system of claim 11, wherein the one or more processors are further configured to:
provide for display via the user interface, a graphical representation of at least a portion of the natural language query result.

18. One or more non-transitory computer-readable storage media including instructions that, when executed by one or more processors, cause the one or more processors to:
generate, using a first machine learning model of a machine learning framework, and for a natural language query, an intent prediction that identifies a likelihood of a target query intent wherein the intent prediction is based on a transformation of the natural language query into a query embedding;
generate, using a second machine learning model of the machine learning framework, and for the natural language query, an event prediction that identifies a likelihood of a target event that is associated with the target query intent, wherein the event prediction is based on a hidden state vector of a plurality of previous target events associated with an identifier corresponding to the natural language query;
generate an intent classification for the natural language query based on the intent prediction and the event prediction; and
in response to the intent classification corresponding to the target query intent:
determine, based on the intent classification, a relevant data object from a plurality of candidate data objects based on a relevancy score between the relevant data object and the natural language query; and
provide, via a user interface, a natural language query result for the natural language query that identifies the relevant data object.

* * * * *